United States Patent
Fujinami et al.

(10) Patent No.: US 6,697,566 B2
(45) Date of Patent: Feb. 24, 2004

(54) ENCODED SIGNAL CHARACTERISTIC POINT RECORDING APPARATUS

(75) Inventors: Yasushi Fujinami, Tokyo (JP); Toshiya Hamada, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/173,126

(22) Filed: Oct. 15, 1998

(65) Prior Publication Data

US 2002/0191960 A1 Dec. 19, 2002

(30) Foreign Application Priority Data

| Oct. 17, 1997 | (JP) | P9-285456 |
| Oct. 21, 1997 | (JP) | P9-288185 |
| Oct. 21, 1997 | (JP) | P9-288186 |
| Jan. 8, 1998 | (JP) | P10-002639 |
| Feb. 27, 1998 | (JP) | P10-046861 |
| Feb. 27, 1998 | (JP) | P10-046862 |

(51) Int. Cl.$^7$ .......... H04N 7/26; H04N 5/781; H04N 5/85; H04N 5/90; H04N 5/91
(52) U.S. Cl. .......... 386/111; 386/125
(58) Field of Search .......... 386/1, 33, 111, 386/112, 125, 126; 348/231–233

(56) References Cited

U.S. PATENT DOCUMENTS

| 4,789,979 A | * | 12/1988 | Hiraoka et al. ..... 369/275.4 |
| 5,455,684 A | * | 10/1995 | Fujinami et al. ..... 386/111 |
| 5,535,008 A | * | 7/1996 | Yamagishi et al. ..... 386/109 |
| 5,617,384 A | * | 4/1997 | Yonemitsu et al. ..... 369/32 |
| 5,623,424 A |  | 4/1997 | Azadegan et al. |
| 5,656,348 A | * | 8/1997 | Kudo et al. ..... 428/64.1 |
| 5,724,474 A | * | 3/1998 | Oguro et al. ..... 386/95 |
| 5,809,201 A | * | 9/1998 | Nagasawa ..... 386/68 |
| 5,899,579 A | * | 5/1999 | Park ..... 386/94 |
| 5,949,953 A | * | 9/1999 | Shirakawa et al. ..... 386/70 |
| 6,009,237 A | * | 12/1999 | Hirabayashi et al. ..... 386/111 |
| 6,021,199 A | * | 2/2000 | Ishibashi ..... 380/217 |
| 6,025,886 A | * | 2/2000 | Koda ..... 348/700 |
| 6,094,234 A | * | 7/2000 | Nonomura et al. ..... 348/700 |
| 6,094,521 A | * | 7/2000 | Okayama et al. ..... 386/44 |
| 6,100,940 A | * | 8/2000 | Dieterich ..... 348/700 |
| 6,157,744 A | * | 12/2000 | Nagasaka et al. ..... 382/236 |

FOREIGN PATENT DOCUMENTS

| EP | 0 696 798 | 2/1996 |
| EP | 0 810 794 | 12/1997 |
| WO | WO 97 06531 | 2/1997 |

* cited by examiner

Primary Examiner—Thai Tran
Assistant Examiner—Polin Chieu
(74) Attorney, Agent, or Firm—Frommer Lawrence & Haug LLP; William S. Frommer; Darren M. Simon

(57) ABSTRACT

A characteristic point detection circuit detects a characteristic point from a base band video signal and generates a characteristic point file. A compressed video signal received from the digital satellite broadcast is supplied to a multiplexing circuit as it is in the form of a bit stream. The multiplexing circuit multiplexes the compressed video signal and characteristic point file. A control circuit obtains the characteristic point file from an optical disc during reproduction, and controls reproduction of the compressed video signal. As described herein above, the supplied compressed video signal is recorded in a recording medium without deterioration of the image quality, and the recorded video signal accepts random access.

11 Claims, 39 Drawing Sheets

FIG. 1

```
/---VOLUME.TOC
   |
   -ALBUM.STR
   |
   -PROGRAM
   |   |
   |   -PROGRAM_001.PGI
   |   |
   |   -PROGRAM_002.PGI
   |   :
   |   -PROGRAM_$$$.PGI
   |   :
   -TITLE
   |   |
   |   -TITLE_001.VDR
   |   |
   |   -TITLE_002.VDR
   |   |
   |   -TITLE_003.VDR
   |   :
   |   -TITLE_###.VDR
   |   :
   -CHUNKGROUP
   |   |
   |   -CHUNKGROUP_001.CGIT
   |   |
   |   -CHUNKGROUP_002.CGIT
   |   :
   |   -CHUNKGROUP_@@@.CGIT
   |   :
   -CHUNK
   |   |
   |   -CHUNK_0001.ABST
   |   |
   |   -CHUNK_0002.ABST
   |   :
   |   -CHUNK_%%%%.ABST
   |   :
   -MPEGAV
   |   |
   |   -STREAMS-001
   |   |    |
   |   |    -CHUNK_0001.MPEG2
   |   |    |
   |   |    -CHUNK_0002.MPEG2
   |   |    |
   |   |    -CHUNK_0003.MPEG2
   |   |
   |   -STREAMS-002
   |   |    |
   |   |    -CHUNK_0011.MPEG2
   |   |    |
   |   |    -CHUNK_0012.MPEG2
   |   |    :
   |   :
   |   -STREAMS_&&&
   |        |
   |        -CHUNK_%%%%.MPEG2
   |        :
   -SCRIPT
   |
   -PICTURES
   |    |
   |    -TITLE_001.JACKET
   |    |
   |    -TITLE_001.THUMB
   |    |
   |    -PROGRAM_002.THUMB
   |    :
   -GRAPHICS
```

FIG. 2

| Syntax | Number of Bits | Mnemonic |
|---|---|---|
| VOLUME.TOC{ | | |
|     file_type_id | 8*16 | char[16] |
|     volume_information() | | |
|     text_block() | | |
| } | | |

FIG. 3

| Syntax | Number of Bits | Mnemonic |
|---|---|---|
| volume_information() { | | |
|     volume_attribute() | | |
|     resume() | | |
|     volume_rating() | | |
|     write_protect() | | |
|     play_protect() | | |
|     recording_timer() | | |
| } | | |

FIG. 4

| Syntax | Number of Bits | Mnemonic |
|---|---|---|
| volume_attribute() { | | |
|     volume_attribute_length | 32 | uimsbf |
|     vdr_version | 4*4 | bcd |
|     reserved | 6 | bslbf |
|     title_playback_mode_flag | 1 | bslbf |
|     program_playback_mode_flag | 1 | bslbf |
|     volume_play_time() | 4*8 | bcd |
|     update_time_count() | 32 | uimsbf |
|     maker_id | 8*16 | char[16] |
|     model_code | 8*16 | char[16] |
|     POSID | 32 | bslbf |
| } | | |

FIG. 5

| Syntax | Number of Bits | Mnemonic |
|---|---|---|
| resume() { | | |
|     resume_length | 32 | uimsbf |
| | | |
|     reserved        // for byte alignment | 3 | bslbf |
|     resume_switch | 1 | bit |
|     reserved | 4 | bslbf |
|     number_of_records | 4 | uimsbf |
| | | |
|     reserved        // for byte alignment | 7 | bslbf |
|     resume_auto_execute_time_flag | 1 | bit |
|     resume_auto_execute_time() | 4*14 | bcd |
|     reserved | 4 | bslbf |
|     resume_auto_execute_record_number | 4 | uimsbf |
| | | |
|     for(i=0;i<number_of_records;i++) { | | |
|         resume_mode_flag | 4 | bslbf |
|         object_type | 4 | bslbf |
|         linked_record_number | 4 | uimsbf |
|         number_of_times | 16 | uimsbf |
|         resume_updated_time() | 4*14 | bcd |
| | | |
|         switch(object_type) { | | |
|           case title: | | |
|             title_number | 16 | uimsbf |
|             title_local_time_stamp | 64 | uimsbf |
|             break; | | |
|           case program: | | |
|             program_number | 16 | uimsbf |
|             program_local_time_stamp | 64 | uimsbf |
|             break; | | |
|           case program_bind: | | |
|             program_bind_number | 16 | uimsbf |
|             program_order | 16 | uimsbf |
|             program_number | 16 | uimsbf |
|             program_local_time_stamp | 64 | uimsbf |
|             break; | | |
|           case play_item: | | |
|             play_item_number | 16 | uimsbf |
|             play_item_local_time_stamp | 64 | uimsbf |
|             break | | |
|         } | | |
|     } | | |
| } | | |

FIG. 6

| Syntax | Number of Bits | Mnemonic |
|---|---|---|
| volume_rating() { | | |
|    volume_rating_id | 8*16 | char[16] |
|    volume_rating_length | 32 | uimsbf |
|    reserved | 6 | bslbf |
|    volume_rating_type | 2 | bslbf |
|    volume_rating_password | 128 | bslbf |
|    switch (volume_rating_type) { | | |
|     case age_limited: | | |
|       number_of_rating | 8 | uimsbf |
|       for (i=0; i<number_of_rating; i++) { | | |
|         country_code_for_rating | 24 | bslbf |
|         age_for_volume_rating | 8 | uimsbf |
|       } | | |
|       break; | | |
|     case CARA: | | |
|       reserved | 4 | bslbf |
|       CARA_category | 4 | bslbf |
|       reserved | 24 | bslbf |
|       break; | | |
|     case RSAC: | | |
|       reserved | 4 | bslbf |
|       RSAC_category | 4 | bslbf |
|       reserved | 4 | bslbf |
|       RSAC_level | 4 | bslbf |
|       reserved | 16 | bslbf |
|       break; | | |
|    } | | |
| } | | |

F I G. 7

| Syntax | Number of Bits | Mnemonic |
|---|---|---|
| write_protect() { | | |
|     write_protect_length | 32 | uimsbf |
|     volume_write_protect_level | 4 | uimsbf |
|     password_enable_flag | 1 | bslbf |
|     append_only_flag | 1 | bslbf |
|     expiration_time_enable_flag | 1 | bslbf |
|     number_of_times_enable_flag | 1 | bslbf |
|     password_for_volume_write_protect | 128 | bslbf |
|     reserved | 8 | bslbf |
|     write_protect_set_time() | 56 | bcd |
|     reserved | 8 | bslbf |
|     write_protect_expiration_time() | 56 | bcd |
|     number_of_times | 16 | uimsbf |
| } | | |

FIG. 8

| Syntax | Number of Bits | Mnemonic |
|---|---|---|
| play_protect() { | | |
|     play_protect_length | 32 | uimsbf |
|     volume_play_protect_flag | 2 | bslbf |
|     reserved | 2 | bslbf |
|     password_enable_flag | 1 | bslbf |
|     reserved | 1 | bslbf |
|     expiration_time_enable_flag | 1 | bslbf |
|     number_of_times_enable_flag | 1 | bslbf |
|     password_for_volume_play_protect | 128 | bslbf |
|     reserved | 8 | bslbf |
|     play_protect_set_time() | 56 | bcd |
|     reserved | 8 | bslbf |
|     play_protect_expiration_time() | 56 | bcd |
|     number_of_times | 16 | uimsbf |
| } | | |

FIG. 9

| Syntax | Number of Bits | Mnemonic |
|---|---|---|
| recording_timer() { | | |
|     recording_timer_length | | |
|     recording_timer_flag | | |
|     number_of_entry | | |
|     for(i=0;i<number_of_entry;i++) { | | |
|         date_and_time | | |
|         channel | | |
|         program | | |
|         : | | |
|     } | | |
| } | | |

FIG. 10

| Syntax | Number of Bits | Mnemonic |
|---|---|---|
| text_block() { | | |
|     text_block_length | 32 | uimsbf |
|     number_of_language_sets | 8 | uimsbf |
|     number_of_text_items | 16 | uimsbf |
|     for(i=0;i<number_of_language_sets;i++) { | | |
|         language_set() | | |
|     } | | |
|     for(i=0;i<number_of_text_items;i++) { | | |
|         text_item() | | |
|     } | | |
| } | | |

FIG. 11

| Syntax | Number of Bits | Mnemonic |
|---|---|---|
| language_set() { | | |
|     reserved | 8 | bslbf |
|     language_code | 24 | bslbf |
|     character_set_type | 8 | bslbf |
|     number_of_language_set_names | 8 | uimsbf |
|     for(i=0;i<number_of_language_set_names;i++) { | | |
|         character_set_type_for_name | 8 | bslbf |
|         language_set_name_length | 8 | uimsbf |
|         language_set_name | 8*language_set_name_length | bslbf |
|     } | | |
| } | | |

FIG. 12

| Syntax | Number of Bits | Mnemonic |
| --- | --- | --- |
| text_item() { | | |
|    text_item_length | 16 | uimsbf |
|    text_item_id | 16 | uimsbf |
|    text_item_sub_id | 16 | uimsbf |
|    flags | 8 | bslbf |
|    number_of_used_language_sets | 8 | uimsbf |
|    //loop for each language set | | |
|    for(i=0;i<number_of_used_language_sets;i++) { | | |
|       language_set_id | 8 | uimsbf |
|       reserved | 4 | bslbf |
|       text_string_length | 16 | uimsbf |
|       text_string | 8*text_string_length | bslbf |
|       bitmap() | | |
|    } | | |
|    stuffing_bytes | 8*n | bslbf |
| } | | |

FIG. 13

| Syntax | Number of Bits | Mnemonic |
| --- | --- | --- |
| ALBUM.STR{ | | |
|    file_type_id | 8*16 | char[16] |
|    album() | | |
|    text_block() | | |
| } | | |

FIG. 14

| Syntax | Number of Bits | Mnemonic |
|---|---|---|
| album() { | | |
|   album_length | 32 | uimsbf |
|   reserved | 6 | bslbf |
|   volume_status | 1 | bslbf |
|   if (volume_status== "1b" ) { | | |
|     chief_volume_flag | 1 | bslbf |
|   } eise { | | |
|     reserved | 1 | "0" |
|   } | | |
|   if (volume_status== "1b" ) { | | |
|     if (chief_volume_flag== "1b" ) { | | |
|       reserved | 6 | bslbf |
|       album_type | 2 | bslbf |
|       albim_id | 128 | bslbf |
|       number_of_discs_in_album | 16 | uimsbf |
|       number_of_volumes_in_album | 16 | uimsbf |
|       for (i=0;i<number_of_volumes_in_album;i++) { | | |
|         disc_id_for_album_member | 128 | bslbf |
|         volume_id_for_album_member | 128 | bslbf |
|         title_offset_number | 16 | uimsbf |
|       } | | |
|       reserved_for_program_bind | 8 | bslbf |
|       number_of_program_binds | 8 | uimsbf |
|       for (i=0;i<number_of_program_binds;i++) { | | |
|         number_of_program_in_this_program_bind | 16 | uimsbf |
|         for(i=0;i<number_of_programs_in_this_program_bind;i++){ | | |
|           disc_id_for_program_bind_member | 128 | uimsbf |
|           volume_id_for_program_bind_member | 128 | uimsbf |
|           program_number | 16 | uimsbf |
|         } | | |
|       } | | |
|     }else{    //chief_volume_flag== "0b" | | |
|       chief_disc_id | 128 | uimsbf |
|       chief_volume_id | 128 | uimsbf |
|       (album_id | 128 | bslbf |
|     } | | |
|   } | | |
| } | | |

FIG. 15

| Syntax | Number of Bits | Mnemonic |
|---|---|---|
| TITLE_###. VDR{ | | |
|     file_type_id | 8*16 | char [16] |
|     title_info() | | |
|     text_block() | | |
| } | | |

FIG. 16

| Syntax | Number of Bits | Mnemonic |
|---|---|---|
| title_info() { | | |
|     title_info_length | 32 | uimsbf |
|     flags_for_title | 32 | bslbf |
|     cgit_file_id | 16 | uimsbf |
|         title_start_chunk_group_time_stamp | 64 | uimsbf |
|     title_end_chunk_group_time_stamp | 64 | uimsbf |
|     title_playback_time() | 32 | bcd |
|     reserved | 32 | bslbf |
|     number_of_marks | 16 | uimsbf |
|     for (i=0;i<number_of_marks;i++) { | | |
|         reserved | 4 | bslbf |
|         mark_type | 4 | bslbf |
|         mark_chunk_group_time_stamp | 64 | uimsbf |
|     } | | |
|     stuffing_bytes | 8*n | bslbf |
| } | | |

FIG. 17

| Syntax | Number of Bits | Mnemonic |
|---|---|---|
| PROGRAM_$$$.PGI { | | |
|     file_type_id | 8*16 | char[16] |
|     program() | | |
|     text_block() | | |
| } | | |

FIG. 18

| Syntax | Number of Bits | Mnemonic |
|---|---|---|
| program() { | | |
|     program_length | 32 | uimsbf |
|     flags_for_program | 32 | bslbf |
|     program_status | 4 | bslbf |
|     program_playback_time() | 32 | bslbf |
|     reserved | 32 | bslbf |
|     number_of_play_sequences | 16 | uimsbf |
|     for(j=0;j<number_of_play_sequence;j++) { | | |
|         number_of_play_lists | 16 | uimsbf |
|         for(k=0;k<number_of_play_lists;k++) { | | |
|             play_list_start_time_stamp_offset | 64 | uimsbf |
|             play_list(k) | | |
|         } | | |
|     } | | |
|     stuffing_bytes | 8*n | bslbf |
| } | | |

FIG. 19

| Syntax | Number of Bits | Mnemonic |
|---|---|---|
| play_list() { | | |
|     //playback sequence of play items in this play list | | |
|     number_of_play_items | 16 | uimsbf |
|     for(k=0;k<number_of_play_items;k++) { | | |
|         play_item_number | 16 | uimsbf |
|         reserved | 31 | bslbf |
|         seamless_connection_flag | 1 | bslbf |
|     } | | |
|     //play_item_table | | |
|     for(PIN=1;PIN<=number_of_play_items_in_program;PIN++) { | | |
|         play_item() | | |
|     } | | |
| } | | |

FIG. 20

| Syntax | Number of Bits | Mnemonic |
|---|---|---|
| play_item() { | | |
|     play_item_length | 32 | uimsbf |
|     play_item_type | 8 | bslbf |
|     play_mode | 8 | bslbf |
|     total_playback_time() | 32 | bcd |
|     menu_item_number | 16 | uimsbf |
|     retum_item_number | 16 | uimsbf |
|     next_item_number | 16 | uimsbf |
|     prev_item_number | 16 | uimsbf |
|     if(play_item_type= "0000b" ){ | | |
|       //play item for one "cut" | | |
|       title_number | 16 | uimsbf |
|       //IN point | | |
|       item_start_time_stamp | 64 | uimsbf |
|       //OUT point | | |
|       item_end_time_stamp | 64 | uimsbf |
|     } | | |
| } | | |

FIG. 21

| Syntax | Number of Bits | Mnemonic |
|---|---|---|
| CHUNKGROUP_###.CGIT{ | | |
|     file_type_id | 8*16 | char[16] |
|     chunkgroup_time_base_flags | 32 | bslbf |
|     chunkgroup_time_base_offset | 64 | uimsbf |
|     chunk_connection_info() | | |
|     text_block() | | |
| } | | |

FIG. 22

| Syntax | Number of Bits | Mnemonic |
|---|---|---|
| chunk_connection_info() { | | |
|     chunk_connection_info_length | 32 | uimsbf |
|     reserved | 16 | bslbf |
|     number_of_chunks | 16 | uimsbf |
|     chunk_sync_play_flag | 8 | bslbf |
|     // chunk info file list | | |
|     for( i =0; i <number_of_chunks; i++) { | | |
|         chunk_arrangement_info() | | |
|     } | | |
| } | | |

FIG. 23

| Syntax | Number of Bits | Mnemonic |
|---|---|---|
| chunk_arrangement_info() { | | |
|   chunk_arrangement_info_length | 32 | uimsbf |
|   chunk_info_file_id | 16 | bslbf |
|   reserved | 5 | bslbf |
|   chunk_switch_stream_id | 16 | bslbf |
|   presentation_start_cg_time_count | 64 | uimsbf |
|   presentation_end_cg_time_count | 64 | uimsbf |
|   reserved | 4 | bslbf |
|   chunk_time_count_type | 4 | bslbf |
|   number_of_start_original_time_count_extension | 8 | uimsbf |
|   number_of_end_original_time_count_extension | 8 | uimsbf |
|   // presentation start position and time | | |
|   presentation_start_original_time_count | 64 | uimsbf |
|   presentation_end_original_time_count | 64 | uimsbf |
|   for(i=0;j<number_of_start_original_time_count_extension;j++) | | |
|     tc_ext_attributes | 16 | bslbf |
|     start_original_time_count_extension | 64 | uimsbf |
|   } | | |
|   // presentation end position and time | | |
|   for(k=0;k<number_of_end_original_time_count_extension;k++) { | | |
|     tc_ext_attributes | 16 | bslbf |
|     end_original_time_count_extension | 64 | uimsbf |
|   } | | |
|   transition_info() | | |
| } | | |

FIG. 24

| Syntax | Number of Bits | Mnemonic |
|---|---|---|
| CHUNK_%%%%.ABST( | | |
|     file_type_id | 8*16 | char[16] |
|     info_type | 4 | bslbf |
|     reserved | 3 | bslbf |
|     cognizant_recording_indicator | 1 | bslbf |
|     //stream_info() | | |
| | | |
|     if (info_type == "MPEG2_system_TS" ) { | | |
|         number_of_programs | 8 | uimsbf |
|     else { | | |
|         number_of_programs | 8 | '0000 0001' |
|     } | | |
| | | |
|     for(i=0;i<number_of_programs;i++){ | | |
|         number_of_streams | 8 | uimsbf |
|         for (i=0;i<number_of_streams;i++) { | | |
|             stream_identifier | 16 | bslbf |
| | | |
|             //slot type information | | |
|             reserved | 4 | bslbf |
|             slot_unit_type | 4 | bslbf |
|             if (slot_unit_type== "time_stamp" ) { | | |
|                 slot_time_length | 32 | uimsbf |
|             } else { | | |
|                 reserved | 32 | bslbf |
|             } | | |
|             number_of_slots | 32 | uimsbf |
|             number_of_thinned_out_slots | 8 | uimsbf |
| | | |
|             //stream attribute | | |
|             bitstream_attribute() | | |
| | | |
|         } | | |
| | | |
|         //loop of slot information | | |
|         for (i=0;i<number_of_streams;i++) { | | |
|             slot_info() | | |
|         } | | |
|     } | | |
|     text_block() | | |
| } | | |

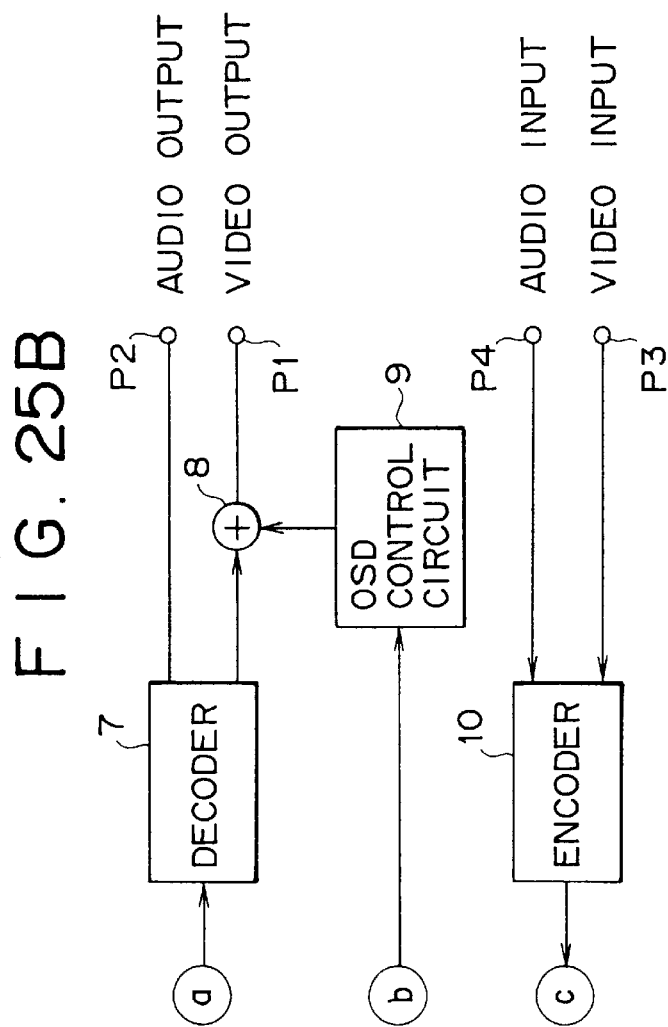

FIG. 26

```
|----VOLUME.TOC
    —ALBUM.STR
    —PROGRAM
    |      —PROGRAM_001.PGI
    —TITLE
    |      —TITLE_001.VDR
    |      —TITLE_002.VDR
    |      —TITLE_003.VDR
    |
    —CHUNKGROUP
    |      —CHUNKGROUP_001.CGIT
    |      —CHUNKGROUP_002.CGIT
    |
    —CHUNK
    |      —CHUNK_0001.ABST
    |      —CHUNK_0011.ABST
    |      —CHUNK_0012.ABST
    |
    —MPEGAV
           —STREAMS_001
           |      —CHUNK_0001.MPEG2
           |
           —STREAMS_002
                  —CHUNK_0011.MPEG2
                  —CHUNK_0012.MPEG2
```

F I G. 27
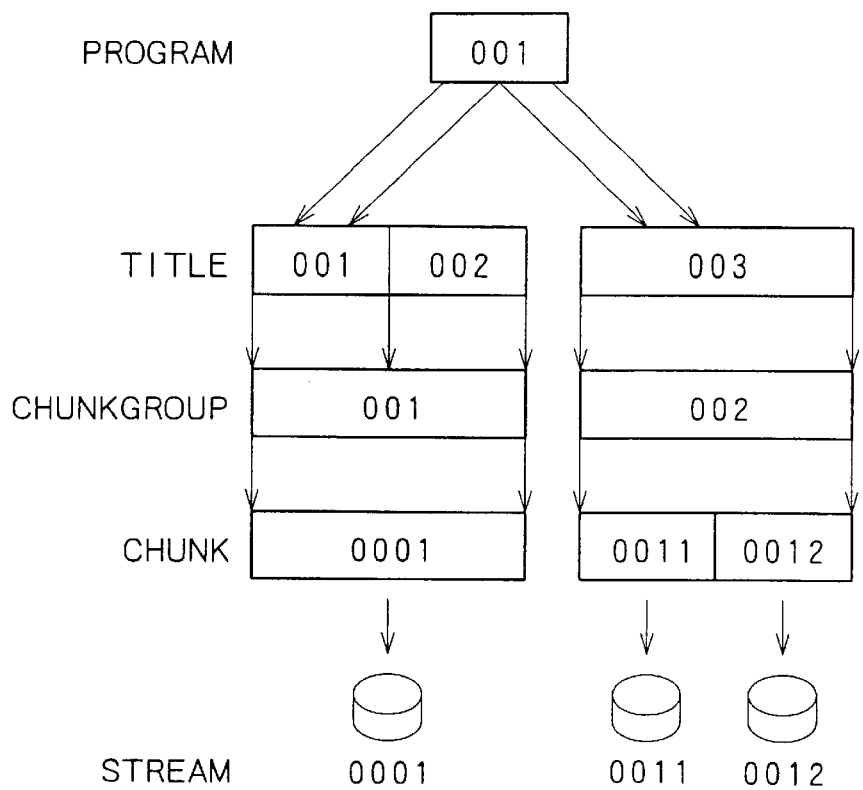
F I G. 28
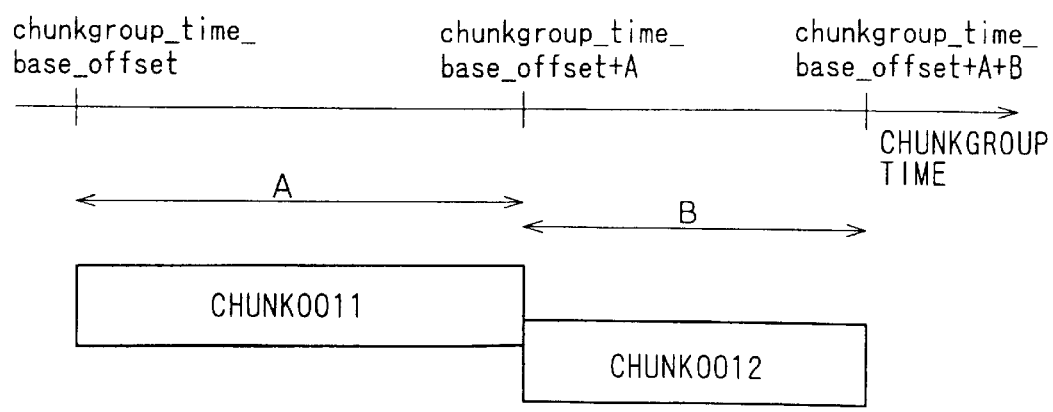

FIG. 29

```
/-----MPEGAV
     |     -STREAMS_003
     |     |     -CHUNK_0031.MPEG2
```

FIG. 30

```
/---VOLUME.TOC
   -ALBUM.STR
   -PROGRAM
   |     -PROGRAM_001.PGI
   -TITLE
   |     -TITLE_001.VDR
   |     -TITLE_002.VDR
   |     -TITLE_003.VDR
   |     -TITLE_004.VDR*
   |
   -CHUNKGROUP
   |     -CHUNK_001.CGIT
   |     -CHUNK_002.CGIT
   |     -CHUNK_003.CGIT*
   |
   -CHUNK
   |     -CHUNK_0001.ABST
   |     -CHUNK_0011.ABST
   |     -CHUNK_0012.ABST
   |     -CHUNK_0031.ABST*
   |
   -MPEGAV
   |     -STREAMS_001
   |     |     -CHUNK_0001.MPEG2
   |     |
   |     -STREAMS_002
   |     |     -CHUNK_0011.MPEG2
   |     |     -CHUNK_0012.MPEG2
   |     |
   |     -STREAMS_003*
   |     |     -CHUNK_0031.MPEG2*
   |     |
```

FIG.32

```
/-----MPEGAV
     |     -STREAMS_002
     |     |      -CHUNK_0031.MPEG2
```

FIG.33

```
/---VOLUME.TOC
   -ALBUM.STR
   -PROGRAM
   |     -PROGRAM_001.PGI
   -TITLE
   |     -TITLE_001.VDR
   |     -TITLE_002.VDR
   |     -TITLE_003.VDR
   |     -TITLE_004.VDR*
   |
   -CHUNKGROUP
   |     -CHUNKGROUP_001.CGIT
   |     -CHUNKGROUP_002.CGIT
   |
   -CHUNK
   |     -CHUNK_0001.ABST
   |     -CHUNK_0011.ABST
   |     -CHUNK_0012.ABST
   |     -CHUNK_0031.ABST*
   |
   -MPEGAV
   |     -STREAMS_001
   |     |     -CHUNK_0001.MPEG2
   |     |
   |     -STREAMS_002
   |     |     -CHUNK_0011.MPEG2
   |     |     -CHUNK_0012.MPEG2
   |     |     -CHUNK_0031.MPEG2*
   |     |
```

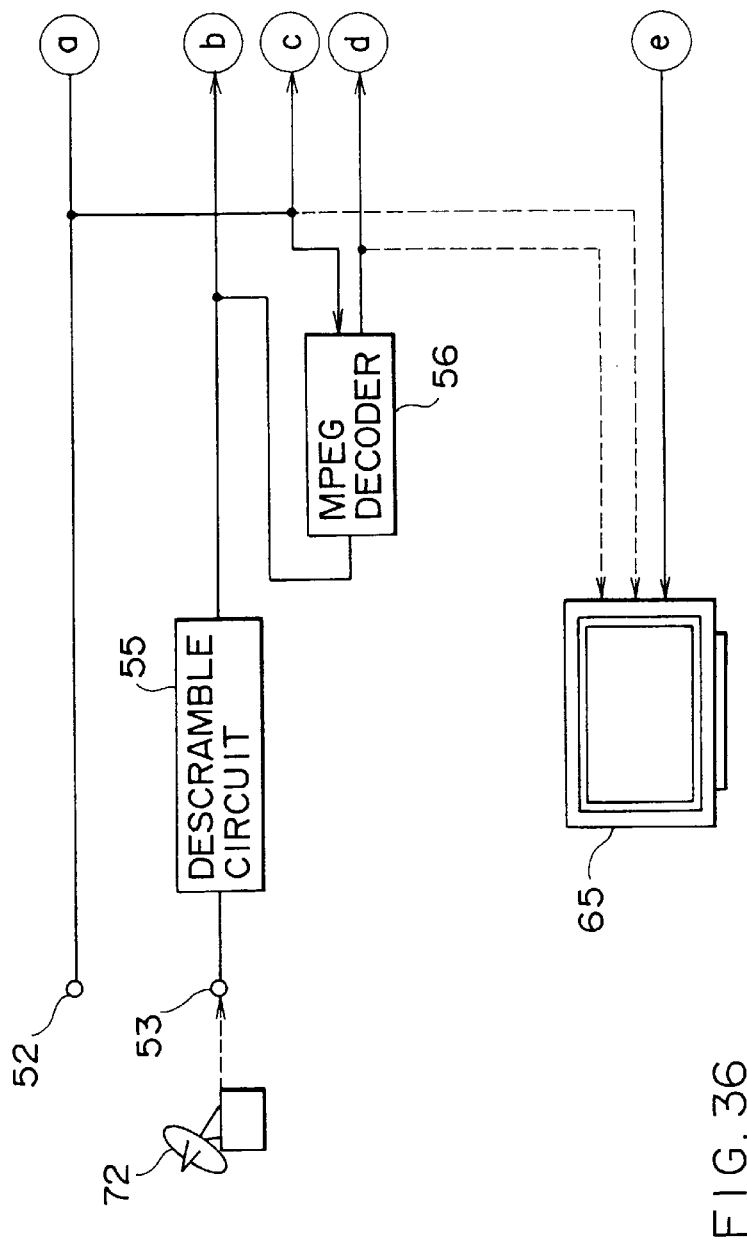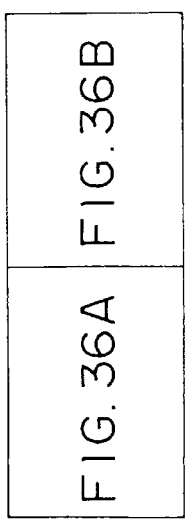

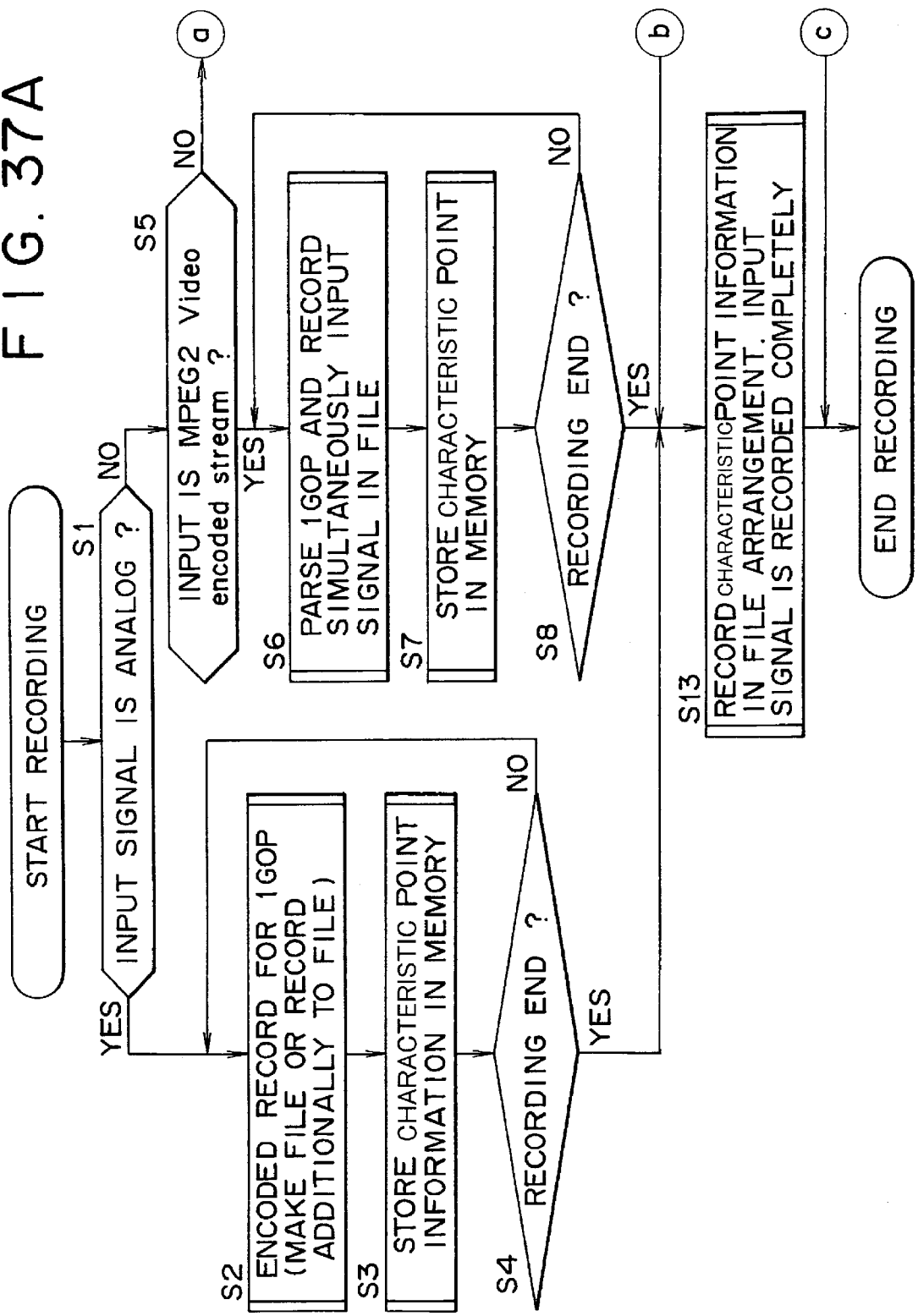

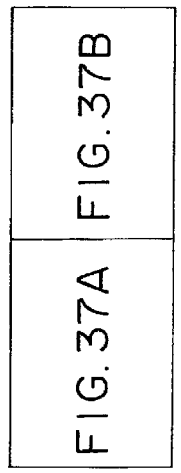
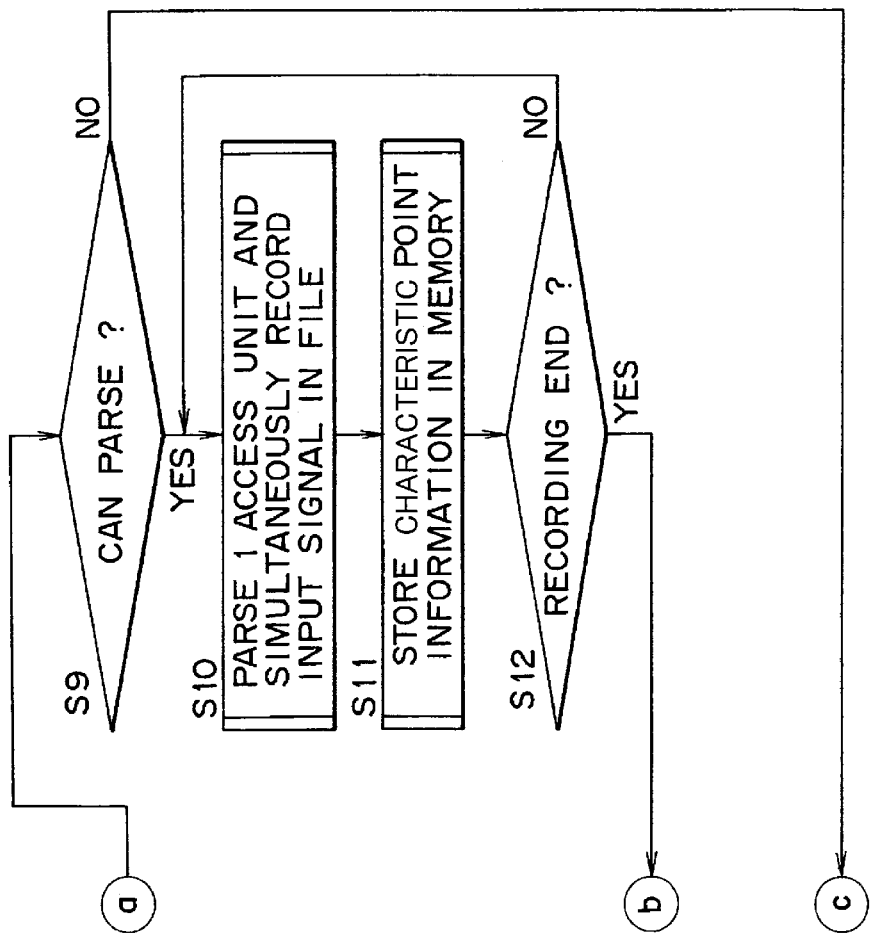

FIG. 38

| field name | value |
|---|---|
| file_type_id | "STRM_INF_FILE_->" |

FIG. 39

| info_type | Meaning |
|---|---|
| 0000 | MPEG2_System_PS |
| 0001 | MPEG2_System_TS |
| 0010 | MPEG2_System_PES |
| 0011 | MPEG1_System_stream |
| 0100 .. 0111 | reserved |
| 1000 | Consumer_DVC |
| 1001 .. 1111 | reserved |

FIG. 40

| cognizant_recoding_indicator | Meaning |
|---|---|
| 0b | This chunk was recorded by noncognizant device |
| 1b | This chunk was recorded by cognizant device |

FIG. 41

| slot_unit_type | Meaning |
|---|---|
| 0000b | 'time_stamp':time stamp value |
| 0001b | 'GOP' : one GOP (Group of pictures) |
| 0010b | 'audio_frame' : one audio frame |
| 0011b .. 1111b | reserved |

FIG. 42

| Syntax | Number of Bits | Mnemonic |
|---|---|---|
| bitstream_attribute() { | | |
|     bitstream_attribute_id | 8*16 | char [16] |
|     bitstream_attribute_length | 32 | uimsbf |
|     reserved | 4 | bslbf |
|     attribute_type | 4 | bslbf |
|     switch(attribute_type) { | | |
|         case video: | | |
|             video_attribute() | | |
|             break; | | |
|         case audio: | | |
|             audio_attribute() | | |
|             break; | | |
|         default: | | |
|             break; | | |
|     } | | |
| } | | |

FIG. 43

| field name | value |
|---|---|
| bitstream_attribute_id | "STRM_ATTRBT_00->" |

FIG. 44

| attribute_type | Meaning |
|---|---|
| 0000b | video |
| 0001b | audio |
| 0010b | reserved for graphics |
| 0011b | reserved for PBC |
| 0100b .. 1111b | reserved |

FIG. 45

| Syntax | Number of Bits | Mnemonic |
|---|---|---|
| video_attribute() { | | |
|     input_video_source | 4 | bslbf |
|     video_compression_mode | 4 | bslbf |
|     picture_rate | 4 | bslbf |
|     picture_scan_type | 4 | bslbf |
|     vertical_lines | 4 | bslbf |
|     horizontal_active_pixels | 16 | uimsbf |
|     aspect_ratio | 4 | bslbf |
|     pixel_ratio | 2 | bslbf |
|     CC_existence | 2 | bslbf |
|     recording_mode | 4 | bslbf |
|     copyright_information | 64 | bslbf |
| } | | |

FIG. 46

| input_video_source | Meaning |
|---|---|
| 0000b | unknown |
| 0001b | inapplicable |
| 0010b | analog component input |
| 0011b | analog composit input |
| 0100b | analog Y/C separated input |
| 0101b | local digital bus (internal IRD etc.) |
| 0110b | IEEEE 1394 |
| 0111b | SDI (Serial Digital Interface) |
| 1000b .. 1111b | reserved |

FIG. 47

| video_compression_mode | Meaning |
|---|---|
| 0000b | unknown |
| 0001b | inapplicable |
| 0010b | MPEG1 Video |
| 0011b | MPEG2 Video |
| 0100b | DV |
| 0101b . . 1111b | reserved |

FIG. 48

| picture_rate | Meaning |
|---|---|
| 0000b | unknown |
| 0001b | 24000/1001 (Hz) |
| 0010b | 24 |
| 0011b | 25 |
| 0100b | 30000/1001 |
| 0101b | 30 |
| 0110b | 50 |
| 0111b | 60000/1001 |
| 1000b | 60 |
| 1001b . . 1111b | reserved |

FIG. 49

| picture_scan_type | Meaning |
|---|---|
| 0000b | unknown |
| 0001b | inapplicable |
| 0010b | progressive |
| 0011b | interlace |
| 0100b . . 1111b | reserved |

FIG. 50

| vertical_lines | Meaning: number of active vertical lines (total number of vertical lines) |
|---|---|
| 0000b | unknown |
| 0001b | inapplicable |
| 0010b | 480 (525) |
| 0011b | 720 (750) |
| 0100b | 1035 (1125) |
| 0101b | 1080 (1125) |
| 0110b . . 1111b | reserved |

FIG. 51

| aspect_ratio | Meaning |
|---|---|
| 0000b | unknown |
| 0001b | inapplicable |
| 0010b | 4 : 3 |
| 0011b | 16 : 9 |
| 0100b | 2.21 : 1 |
| 1001b | 1 : 1 |
| 0110b . . 1111b | reserved |

FIG. 52

| pixel_ratio | Meaning |
|---|---|
| 0000b | unknown |
| 0001b | inapplicable |
| 0010b | 1 : 1 |
| 0011b | 1 : 1.125 |
| 0100b | reserved |
| 0101b . . 1111b | reserved |

FIG. 53

| CC_existence | Meaning |
|---|---|
| 0000b | unknown |
| 0001b | inapplicable |
| 0010b | exist |
| 0011b | not exist |
| 0100b | reserved |
| 0101b . . 1111b | reserved |

FIG. 54

| recording_mode | Meaning |
|---|---|
| 0000b | unknown |
| 0001b | inapplicable |
| 0010b | Standard Play |
| 0011b | Long Play |
| 0100b | reserved |
| 0101b . . 1111b | reserved |

F I G. 55

```
Syntax                                          Number of Bits    Mnemonic audio_attribute() {
    reserved                                         4             bslbf
    number_of_audio_streams                          4             uimsbf
    for (j=0;j<number_of_audio_streams;j++) {
        stream_id                                    8             bslbf
        sub_stream_id                                8             bslbf
        reserved                                     8             bslbf
        language_code                               24             bslbf
        input_source                                 4             bslbf
        audio_coding_mode                            4             bslbf
        bitrate                                      8             bslbf
        q_bit                                        4             bslbf
        fs                                           4             bslbf
        reserved                                     7             bslbf
        emphasis                                     1             bslbf
        number_of_channels                           8             uimsbf
        for (k=0;k<number_of_channels;k++) {
            reserved                                 4             bslbf
            status_of_this_channel                   4             bslbf
            channel_assignment                       8             bslbf
        }
        (Dynamic_range_control)
        karaoke()
    }
}
```

F I G. 56

| input_source | Meaning |
|---|---|
| 0000b | unknown |
| 0001b | inapplicable |
| 0010b | anlog input |
| 0011b | reserved |
| 0100b | internal IRD |
| 1001b | IEEE 1394 |
| 0110b | IEC 958 |
| 0111b . . 1111b | reserved |

FIG. 57

| audio_coding_mode | Meaning |
|---|---|
| 0000b | unknown |
| 0001b | inapplicable |
| 0010b | LPCM |
| 0011b | AC-3 |
| 0100b | MPEG Audio |
| 1001b | ATRAC |
| 0101b .. 1111b | reserved |

FIG. 58

| bitrate | Meaning |
|---|---|
| 0000 0000b | variable bitrate |
| 0000 0001b | inapplicable |
| 0000 0010b ..1111 1111b | reserved |

FIG. 59

| q_bit | Meaning |
|---|---|
| 0000b | unknown |
| 0001b | inapplicable |
| 0010b | 8 |
| 0011b | 12 |
| 0100b | 16 |
| 1001b | 20 |
| 0110b | 24 |
| 0111b .. 1111b | reserved |

FIG. 60

| fs | Meaning |
|---|---|
| 0000b | unknown |
| 0001b | inapplicable |
| 0010b | 8 kHz |
| 0011b | 16 kHz |
| 0100b | 32 kHz |
| 1001b | 44.1 kHz |
| 0110b | 48 kHz |
| 0111b | 96 kHz |
| 1000b . . 1111b | reserved |

FIG. 61

| emphasis | Meaning |
|---|---|
| 0b | emphasis off |
| 1b | emphasis on |

FIG.62

```
Syntax                                      Number of Bits    Mnemonic
slot_info() {
    slot_info_id                            8*16              char[16]
    slot_info_length                        32                uimsbf
    switch(slot_unit_type) {
        case'GOP':
        for (i=0;i<number_of_slots;i++) {
            slot_info_for_one_GOP()
        }
        break;
        case'audio_frame':
        for (i=0;i<number_of_slots;i++) {
            slot_info_for_one_audio_frame()
        }
        break;
        case'time_stamp':
        for (i=0;i<number_of_slots;i++) {
            slot_info_for_one_time_slot()
        }
        break;
    }
}
```

FIG.63

| field name | value |
|---|---|
| slot_info_id | "SLOT_INF_00000->" |

FIG. 64

| Syntax | Number of Bits | Mnemonic |
|---|---|---|
| slot_info_for_one_GOP() { | | |
|    slot_length | 24 | uimsbf |
|    //specific info | | |
|    switch (info_type) { | | |
|       case MPEG1_System_stream: | | |
|          sequence_hearder_start_offset | 24 | uimsbf |
|          packet_start_offset | 24 | uimsbf |
|          pack_start_offset | 24 | uimsbf |
|          break; | | |
|       case MPEG2_System_PS: | | |
|          sequence_hearder_start_offset | 24 | uimsbf |
|          PES_packet_start_offset | 24 | uimsbf |
|          pack_start_offset | 24 | uimsbf |
|          break; | | |
|       case MPEG2_System_TS: | | uimsbf |
|          sequence_hearder_start_offset | 24 | uimsbf |
|          TS_packet_start_offset | 16 | uimsbf |
|          PES_packet_start_offset | 24 | uimsbf |
|          TS_packet_start_offset2 | 16 | uimsbf |
|          break; | | |
|       case MPEG2_System_PES: | 24 | uimsbf |
|          sequence_hearder_start_offset | 24 | uimsbf |
|          PES_packet_start_offset | | |
|          break; | | |
|    } | | |
|    GOPH_existence_flag | 1 | bslbf |
|    first_presented_picture_structure | 2 | bslbf |
|    copy_closed_GOP | 1 | bslbf |
|    copy_broken_link | 1 | bslbf |
|    reserved | 2 | bslbf |
|    time_stamp_of_first_picture | 33 | uimsbf |
|    GOP_status | 6 | bslbf |
|    picture_count_type | 2 | bslbf |
|    number_of_pictures | 16 | uimsbf |
|    encode_info() | 32 | bslbf |
|    buffer_occupancy() | 32 | bslbf |
|    camera_info() | 16 | bslbf |
|    reserved | 16 | bslbf |
| } | | |

FIG. 65

| first_presented_picture_structure | Meaning |
|---|---|
| 00b | top field |
| 01b | bottom field |
| 10b . . 11b | reserved |

FIG. 66

| picture_count_type | Meaning |
|---|---|
| 00b | field |
| 01b | field |
| 10b . . 11b | reserved |

FIG. 67

| Syntax | Number of Bits | Mnemonic |
|---|---|---|
| slot_info_for_one_audio_frame( ) { | | |
|     AAU_storage_length | 32 | uimsbf |
|     //specific info | | |
|     AAU_start_byte_position | 16 | uimsbf |
|     flags | 7 | bslbf |
|     encode_info( ) | 32 | bslbf |
|     camera_info( ) | 16 | bslbf |
| } | | |

FIG. 68

| Syntax | Number of Bits | Mnemonic |
|---|---|---|
| slot_info_for_one_time_slot( ) { | | |
| } | | |

ENCODED SIGNAL CHARACTERISTIC POINT RECORDING APPARATUS

BACKGROUND OF THE INVENTION

1. Field of the Invention

This invention relates to an apparatus and method for recording, an apparatus and method for reproducing, an apparatus and method for recording/reproducing, a recording medium, and a distribution medium and more particularly to an apparatus and method for recording, an apparatus and method for reproducing, an apparatus and method for recording/reproducing, a recording medium, and a distribution medium which are suitably used for recording video signals and reproducing recorded video signals.

2. Description of Related Art

Recently, DVD-RAM has been proposed as a recordable optical disk. Such a recordable optical disk is proposed as a large capacity medium having several G bytes, and is promising as a medium for recording AV (Audio Visual) signals such as video signals.

As the supply source of digital AV signals which are possible to be recorded in a recordable optical disk, currently VHS or 8 mm video tapes and digital satellite broadcast are available, and in future, digital ground wave television broadcast will be available.

Digital video signals supplied from such sources are generally compressed according to MPEG (Moving Picture Experts Group)-2 system. Therefore, when a digital video signal supplied from such source is recorded in the recordable optical disk, a video signal compressed according to MPEG-2 system is once decoded, then encoded according to MPEG-2 system, and recorded in the recordable optical disk.

However, such processing including decoding, encoding, and subsequent recording in an optical disk results in deteriorated image quality of the recorded video signal.

In order to minimize the deterioration of image quality, a method in which a supplied bit stream is recorded as it is in a recordable optical disk without encoding and decoding a compressed video signal supplied from a source has been developed. In other words, the method in which the optical disk is used as a data streamer has been developed.

There is no management data for random access to a recorded bit stream in the recordable optical disk in which a video signal is recorded without encoding and decoding as described herein above. In detail, in the optical disk in which the video signal is recorded as described herein above, no management information for indicating a sector position where the provided program starts is recorded. Therefore, in the case of an optical disk in which a bit stream from a source as described herein above is recorded as it is, random access to the recorded video signal is impossible, the greatest advantage of a disk type recording medium is limited.

If an optical disk in which a bit stream formed by encoding an analog input in a recording apparatus is recorded is distinguished from an optical disc in which a bit stream supplied from a source is recorded as it is, the recording/reproducing apparatus involves two types of optical disk resultantly, such mechanism leads to high cost.

SUMMARY OF THE INVENTION

The present invention was accomplished in view of such problem, and it is the object of the present invention to provide capability to record a supplied compressed video signal without deterioration of image quality and capability to take random access to the recorded video signal.

A recording apparatus according to one aspect of the present invention is provided with a file generation means for generating files which contain video or audio signals, a characteristic point information generation means for generating the characteristic point information of the video or audio signals contained in the files for each file generated by the file generation means, and a recording means for recording the files and characteristic point information in a recording medium.

A recording method according to another aspect of the present invention includes a file generation step for generating files which contain video or audio signals, a characteristic point information generation step for generating the characteristic point information of the video or audio signals contained in the files for each file generated by the file generation step, and a recording step for recording the files and characteristic point information in a recording medium.

A distribution medium according to another aspect of the present invention for distributing a program which is possible to be read by a computer for controlling an information processing apparatus to perform processing includes a file generation step for generating files which contain video or audio signals, a characteristic point information generation step for generating the characteristic point information of the video or audio signals contained in the files for each file generated in the file generation step, and a recording step for recording the files and characteristic point information in a recording medium.

A reproducing apparatus according to another aspect of the present invention is provided with a file reproducing means for reproducing files which contain video or audio signals recorded in a recording medium, a characteristic point information reproducing means for reproducing the characteristic point information of the video or audio signals contained in the files recorded in the recording medium for each file reproduced by the file regeneration means, and a reproduction control means for controlling reproduction of the files based on the characteristic point information reproduced by the characteristic point information reproducing means.

A reproducing method according to another aspect of the present invention includes a file reproducing step for reproducing files which contain video or audio signals recorded in a recording medium, a characteristic point information reproducing step for reproducing the characteristic point information of the video or audio signals contained in the files recorded in the recording medium for each file reproduced in the file reproduction step, and a reproduction control step for controlling reproduction of the file based on the characteristic point information reproduced in the characteristic point information reproducing step.

A distribution medium, according to another aspect of the present invention, for distributing a program which is possible to be read by a computer for controlling an information processing apparatus to perform processing includes a file reproducing step for reproducing files which contain video or audio signals recorded in a recording medium, a characteristic point information reproducing step for reproducing the characteristic point information of the video or audio signals contained in the files recorded in the recording medium for each file reproduced in the file reproducing step, and a reproduction control step for controlling reproduction of the file based on the characteristic point information reproduced in the characteristic point information reproducing step.

A recording apparatus according to another aspect of the present invention is provided with an input means for receiving an input signal which contains at least video signals, a characteristic point information detection means for detecting the characteristic point information of the video signal based on a signal contained in the input signal, a video signal recording means for recording at least the video signal out of signals contained in the input signal in a recording medium, and a characteristic point information write means for writing the characteristic point information in a recording medium.

A recording method according to another aspect of the present invention includes an input step for receiving an input signal which contains at least video signals, an characteristic point information detection step for detecting the characteristic point information of the video signal based on a signal contained in the input signal, a video signal recording step for recording at least video signals out of signals contained in the input signals in a recording medium, and a characteristic point information write step for writing the characteristic point information in a recording medium.

A distribution medium, according to another aspect of the present invention, for distributing programs which are possible to be read by a computer for controlling an information processing apparatus to perform processing includes an input step for receiving an input signal which contains at least a video signal, a characteristic point information detection step for detecting the characteristic point information of the video signal based on a signal contained in the input signal, a video signal recording step for recording at least a video signal out of signals contained in the input signal in a recording medium, and a characteristic point information write step for writing the characteristic point information in a recording medium.

A recording/reproducing apparatus according to another aspect of the present invention is provided with a file generation means for generating files which contain video or audio signals, a characteristic point information generation means for generating the characteristic point information of the video or audio signals contained in the files for each file generated by the file generation means, a recording means for recording the files and characteristic point information in a recording medium, a file reproducing means for reproducing files which contain video or audio signals recorded in a recording medium, a characteristic point information reproducing means for reproducing the characteristic point information of the video or audio signals contained in the files recorded in the recording medium for each file reproduced by the file regeneration means, and a reproduction control means for controlling reproduction of the files based on the characteristic point information reproduced by the characteristic point information reproducing means.

A recording/reproducing method according to another aspect of the present invention includes a file generation step for generating files which contain video or audio signals, a characteristic point information generation step for generating the characteristic point information of the video or audio signals contained in the files for each file generated by the file generation step, a recording step for recording the files and characteristic point information in a recording medium, a file reproducing step for reproducing files which contain video or audio signals recorded in a recording medium, a characteristic point information reproducing step for reproducing the characteristic point information of the video or audio signals contained in the files recorded in the recording medium for each file reproduced in the file reproduction step, and a reproduction control step for controlling reproduction of the file based on the characteristic point information reproduced in the characteristic point information reproducing step.

A distribution medium, according to another aspect of the present invention, for distributing programs which are possible to be read by a computer for controlling an information processing apparatus to perform processing includes a file generation step for generating files which contain video or audio signals, a characteristic point information generation step for generating the characteristic point information of the video or audio signals contained in the files for each file generated in the file generation step, a recording step for recording the files and characteristic point information in a recording medium, a file reproducing step for reproducing files containing video or audio signals recorded in a recording medium, a characteristic point information reproducing step for reproducing the characteristic point information of the video or audio signals contained in the files recorded in the recording medium for each file reproduced in the file reproducing step, and a reproduction control step for controlling reproduction of the file based on the characteristic point information reproduced in the characteristic point information reproducing step.

In the recording apparatus according to one aspect of the present invention, the recording method described in claim 5, and the distribution medium described in claim 6, the characteristic point information of video or audio signals in the file is recorded in a recording medium for each file.

In the reproducing according to another aspect of the present invention, the reproducing method according to one aspect of the present invention, and the distribution medium according to one aspect of the present invention, reproduction of the file is controlled based on the characteristic point information recorded in a recording medium for each file.

In the recording apparatus according to another aspect of the present invention, the recording method according to another aspect of the present invention, and the distribution medium according to another aspect of the present invention, the characteristic point information of the video signal is detected and recorded in a recording medium together with the video signal.

In the recording/reproducing apparatus according to another aspect of the present invention, the recording/reproducing method according to another aspect of the present invention, and the distribution medium according to another aspect of the present invention, files and the characteristic point information of each file are recorded in a recording medium. The reproduction of the file is controlled correspondingly to the reproduced characteristic point information.

BRIEF DESCRIPTION OF THE DRAWINGS

FIG. 1 is a diagram for describing the structure of the directory.

FIG. 2 is a diagram for describing VOLUME.TOC.

FIG. 3 is a diagram for describing volume_information

FIG. 4 is a diagram for describing volume_attribute

FIG. 5 is a diagram for describing resume ( ).

FIG. 6 is a diagram for describing volume rating ( ).

FIG. 7 is a diagram for describing write_protect ( ).

FIG. 8 is a diagram for describing play_protect ( ).

FIG. 9 is a diagram for describing recording_timer ( ).

FIG. 10 is a diagram for describing text_block ( ).

FIG. 11 is a diagram for describing language_set ( ).

FIG. 12 is a diagram for describing text_item ( ).

FIG. 13 is a diagram for describing ALBUM. STR.

FIG. 14 is a diagram for describing album ( ).

FIG. 15 is a diagram for describing TITLE_###. VDR.

FIG. 16 is a diagram for describing title_info ( ).

FIG. 17 is a diagram for describing PROGRAM_$$$. PGI.

FIG. 18 is a diagram for describing program ( ).

FIG. 19 is a diagram for describing play_list ( ).

FIG. 20 is a diagram for describing play_item ( ).

FIG. 21 is a diagram for describing CHUNKGROUP_###. CGIT.

FIG. 22 is a diagram for describing chunk_connection_info ( ).

FIG. 23 is a diagram for describing chunk arrangement_info ( ).

FIG. 24 is a diagram for describing CHUNK_%%%%. ABST.

FIG. 26 is a diagram for describing the structure of the directory.

FIG. 27 is a diagram for describing the logic structure of the directory.

FIG. 28 is a diagram for describing offset.

FIG. 29 is a diagram for describing the structure of the directory.

FIG. 30 is a diagram for describing the structure of the directory.

FIG. 32 is a diagram for describing the structure of the directory.

FIG. 33 is a diagram for describing the structure of the directory.

FIGS. 36A–36B are a block diagram for illustrating another structure example of an optical disc apparatus of the present invention.

FIG. 37 is a flow chart for describing accumulation and recording processing of the characteristic point information.

FIG. 38 is a diagram for describing field_type_id.

FIG. 39 is a diagram for describing info_type.

FIG. 40 is a diagram for describing cognizant_recording_indicator.

FIG. 41 is a diagram for describing slot_unit_type.

FIG. 42 is a diagram for describing bitstream_attribute ( ).

FIG. 43 is a diagram for describing bitstream_attribute_id.

FIG. 44 is a diagram for describing attribute_type.

FIG. 45 is a diagram for describing video_attribute ( ).

FIG. 46 is a diagram for describing input_video_source.

FIG. 47 is a diagram for describing video_compression_mode.

FIG. 48 is a diagram for describing picture_rate.

FIG. 49 is a diagram for describing picture_scan_type.

FIG. 50 is a diagram for describing vertical_lines.

FIG. 51 is a diagram for describing aspect_ratio.

FIG. 52 is a diagram for describing pixel_ratio.

FIG. 53 is a diagram for describing CC_existence.

FIG. 54 is a diagram for describing recording_mode.

FIG. 55 is a diagram for describing syntax of audio_attribute ( ).

FIG. 56 is a diagram for describing input_source.

FIG. 57 is a diagram for describing audio_coding_mode.

FIG. 58 is a diagram for describing bitrate.

FIG. 59 is a diagram for describing q_bit.

FIG. 60 is a diagram for describing fs.

FIG. 61 is a diagram for describing emphasis.

FIG. 62 is a diagram for describing syntax of slot_info ( ).

FIG. 63 is a diagram for describing slot_info_id.

FIG. 64 is a diagram for describing syntax of slot_info_for_one_GOP ( ).

FIG. 65 is a diagram for describing first_presented_picture_structure.

FIG. 66 is a diagram for describing picture_count_type.

FIG. 67 is a diagram for describing syntax of slot_info_for_one_audio_frame ( ).

FIG. 68 is a diagram for describing syntax of slot_info_for_one_time_slot ( ).

DETAILED DESCRIPTION OF THE PREFERRED EMBODIMENTS

The embodiment of the present invention will be described hereinafter in detail, to clearly indicate the corresponding relation between the respective means described in claims and components described in the embodiments described hereinafter, components described in the embodiments (though only one example) corresponding to means described in the claims are indicated in parenthesis just after each means as shown herein under. These indications by no means limits the means to the examples described in the parenthesis.

A recording apparatus described in claim 1 is provided with a file generation means (for example, the step S6 in the FIG. 37) for generating files which contain video or audio signals, a characteristic point information generation means (for example, the step S7 in FIG. 37) for generating the characteristic point information of the video or audio signals contained in the files for each file generated by the file generation means, and a recording means (for example, the step S13 in FIG. 37) for recording the files and characteristic point information in a recording medium.

A reproducing apparatus described in claim 7 is provided with a file reproducing means (for example, the reproducing circuit 60 in FIG. 36) for reproducing files which contain video or audio signals recorded in a recording medium, a characteristic point information reproducing means (for example, the reproducing circuit 60 in FIGS. 36A and B) for reproducing the characteristic point information of the video or audio signals contained in the files recorded in the recording medium for each file reproduced by the file regeneration means, and a reproduction control means (for example, the control circuit 63 in FIGS. 36A and B) for controlling reproduction of the files based on the characteristic point information reproduced by the characteristic point information reproducing means.

A recording apparatus described in claim 10 is provided with an input means (for example, the step S1 in FIG. 37) for receiving an input signal which contains at least video signals, a characteristic point information detection means (for example, the step S1 in FIG. 37) for detecting the characteristic point information of the video signal based on a signal contained in the input signal, a video signal recording means (for example, the step S6 in FIG. 37) for recording at least the video signal out of signals contained in the input signal in a recording medium, and a characteristic point information write means (for example, the step S13 in FIG. 37) for writing the characteristic point information in a recording medium.

Figure 36B:
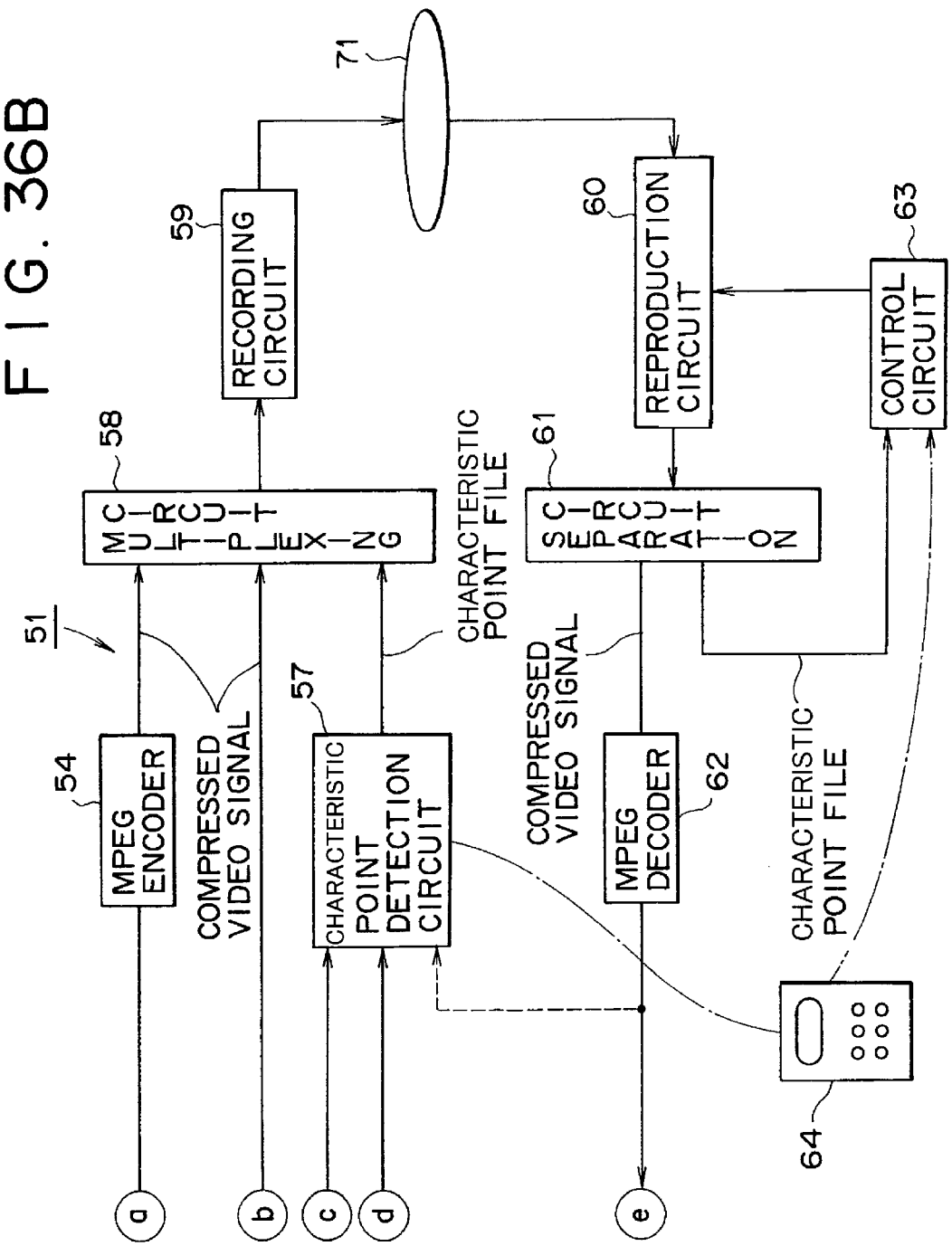

A recording/reproducing apparatus described in claim 9 is provided with a file generation means (for example, the step S6 in FIG. 37) for generating files which contain video or audio signals, a characteristic point information generation means (for example, the step S7 in FIG. 37) for generating the characteristic point information of the video or audio signals contained in the files for each file generated by the file generation means, a recording means (for example, the step S13 in FIG. 37) for recording the files and characteristic point information in a recording medium, a file reproducing means for reproducing files which contain video or audio signals recorded in a recording medium, a characteristic point information reproducing means (for example, the reproducing circuit 60 in FIGS. 36A and B) for reproducing the characteristic point information of the video or audio signals contained in the files recorded in the recording medium for each file reproduced by the file regeneration means, and a reproduction control means (for example, the control circuit 63 in FIGS. 36A and B for controlling reproduction of the files based on the characteristic point information reproduced by the characteristic point information reproducing means.

First, in the file arrangement on a recording medium on/from which the information is recorded/reproduced in the present invention is described. On the medium, as shown in FIG. 1, seven types of files described herein under are recorded.

VOLUME. TOC
ALBUM. STR
PROGRAM_$$$. PGI
TITLE_###. VDR
CHUNKGROUP_@@@. CGIT
CHUNK_%%%%. ABST
CHUNK_%%%%. MPEG2

VOLUME. TOC and ALBUM. STR are recorded in the root directory. In the directory "PROGRAM" recorded just under the root directory, "PROGRAM_$$$. PGI" (herein, "$$$" represents a program number) is recorded. Similarly, in the directory "TITLE" recorded just under the root directory, "TITLE_###. VDR" (herein, "###" represents a title number) is recorded, in the directory "CHUNKGROUP", "CHUNKGROUP_@@@. CGIT" is recorded (herein, "@@@" represents a chunkgroup number), and in the directory "CHUNK", "CHUNK_%%%%. ABST" (herein, "%%%%" represents a chunk number) is recorded.

In the MPEGAV directory recorded just under the root directory, one or more sub-directories are formed additionally, and under these sub-directory "CHUNK_%%%%. MPEG2" (herein, %%%% represents a chunk number) is recorded.

It is normal that there is only one VOLUME. TOC file on a medium. However, in a special medium such as a medium having a hybrid structure comprising a ROM and RAM, it can be possible that there is a plurality of VOLUME. TOC files on a medium. This file is used to indicate the whole characteristics of a medium. The structure of VOLUME. TOC is shown in FIG. 2. file_type_id is recorded at the head, and which indicates that this file is VOLUME. TOC. Subsequently, volume_information ( ) is recorded, and followed finally by text_block ( ).

The structure of volume_information ( ) is shown in FIG. 3. volume_information ( ) contains volume_attribute ( ), resume ( ), volume_rating ( ), write_protect ( ), play_protect ( ), and recording_timer ( ).

volume_attribute ( ) is an area for recording the attribute of logical volume, the detailed structure is shown in FIG. 4. As shown in FIG. 4, this area contains title_playback_mode_flag and program_playback_mode_flag.

resume ( ) is an area on which the information to resume the current state to the state just before ejection when the medium is inserted again, and the detailed structure is shown in FIG. 5.

volume_rating ( ) in FIG. 3 is an area on which the information to realize the viewer age restriction of the whole volume depending on the age and category, the detailed structure is shown in FIG. 6.

write_protect ( ) shown in FIG. 3 is an area on which the information to restrict the changing and erasing operation of title and program recorded in the volume are recorded, and the detailed structure is shown in FIG. 7.

play_protect ( ) shown in FIG. 3 is an area on which the reproduction permission/no permission setting of title and program recorded in the volume or the information for restriction of the number of reproductions are recorded, and the detailed structure is shown in FIG. 8.

recording_timer ( ) shown in FIG. 3 is an area on which the information for controlling recording time is recorded, and the detailed structure is shown in FIG. 9.

The detailed structure of text_block ( ) of VOLUME. TOC shown in FIG. 2 is shown in FIG. 10. The text_block ( ) contains language_set ( ) and text_item, and the detailed structures are shown in FIG. 11 and FIG. 12 respectively.

Normally there is only one file of ALBUM. STR shown in FIG. 1 in a medium. However, in a special medium such as a medium having a hybrid structure comprising a ROM and RAM, it can be possible that there is a plurality of ALBUM. STR files on a medium. This file formed by combining a plurality of media is used to obtain a structure which appears as if it were one medium.

The structure of ALBUM. STR is shown in FIG. 13. file_type_id is recorded at the head, and which indicates that this file is ALBUM. STR. Subsequently album ( ) is recorded, and finally text_block ( ) is recorded.

album ( ) is an area on which the information to deal a plurality of volumes (a plurality of media) as a group is recorded, and the detailed structure is shown in FIG. 14.

The number of files of TITLE_###. VDR shown in FIG. 1 is equal to the number of titles. A title means, for example, one piece of music in a compact disc or one program in television broadcast. The structure of this information is shown in FIG. 15. file_type_id is recorded at the head, this file_type_id indicates that this file is TITLE_###. VDR. Subsequently title_info ( ) is recorded, and finally text_block ( ) is recorded. ### is a character string for indicating a title number.

title_info ( ) is an area on which the starting point, the ending point, and other attributes of the title are recorded, and the detailed structure is shown in FIG. 16.

The number of files of PROGRAM_$$$. PGI shown in FIG. 1 is equal to the number of programs. A program comprises a plurality of cuts which specify the partial area of a title (or whole area), and the respective cuts are reproduced in the specified order. The structure of this information is shown in FIG. 17. file_type_id is recorded at the head, this file_type_id indicates that this file is PROGRAM_$$$. PGI. Subsequently, program ( ) is recorded, and finally text_block ( ) is recorded. $$$ is a character string which indicates a title number.

program ( ) is an area on which the information required to reproduce collected necessary information of the title is recorded without irreversible edition of the material, and the detailed structure is shown in FIG. 18.

program ( ) shown in FIG. 18 has one play_list. The detail of the play_list ( ) is shown in FIG. 19.

A plurality of play_item ( ) is recorded in play_list. The detailed structure of play_item ( ) is shown in FIG. 20.

The number of files of CHUNKGROUP_@@@. CGIT shown in FIG. 1 is equal to the number of chunkgroups. The chunkgroup is the data structure to arrange the pit stream. This file is not recognized by a user as long as the user operates a apparatus for recording/reproducing a medium such as VDR (video disk recorder).

The structure of this information is shown in FIG. 21. file_type_id is recorded at the head, and the file_type_id indicates that this file is CHUNKGROUP_@@@. CGIT. Subsequently chunkgroup_time_base_flags and chunkgroup time_base_offset are recorded, and followed by chunk_connection_info ( ), and finally text_block ( ) is recorded.

chunkgroup_time base_flags indicates a flag of reference counter of chunkgroup, and chunkgroup_time_base_offset indicates the starting time of the reference time axis in chunkgroup. This is a value which is set to a counter for 90 kHz counting up, and has a size of 32 bits. chunk_connection_info ( ) is an area on which the information of characteristic points such as the switching point of video and synchronization between video and audio, and the detailed structure is shown in FIG. 22.

Loops of chunk_arrangement info ( ) are recorded in the chunk_connection_info ( ), and the number of the loops of chunk_arrangement_info ( ) is equal to the number of chunks which belong to the chunkgroup. The detailed structure of chunk_arrangement_info ( ) is shown in FIG. 23.

The number of files of CHUNK_%%%%. ABST shown in FIG. 1 is equal to the number of chunks. The chunk is an information file which is corresponding to one stream file. The information structure is shown in FIG. 24. file_type_id is recorded at the head, the file_type_id indicates that this file is CHUNK_%%%%. ABST.

The CHUNK_%%%%. MPEG2 file shown in FIG. 1 is a stream file. The file contains a bit stream of MPEG unlike other files which records only information.

Figure 25A:
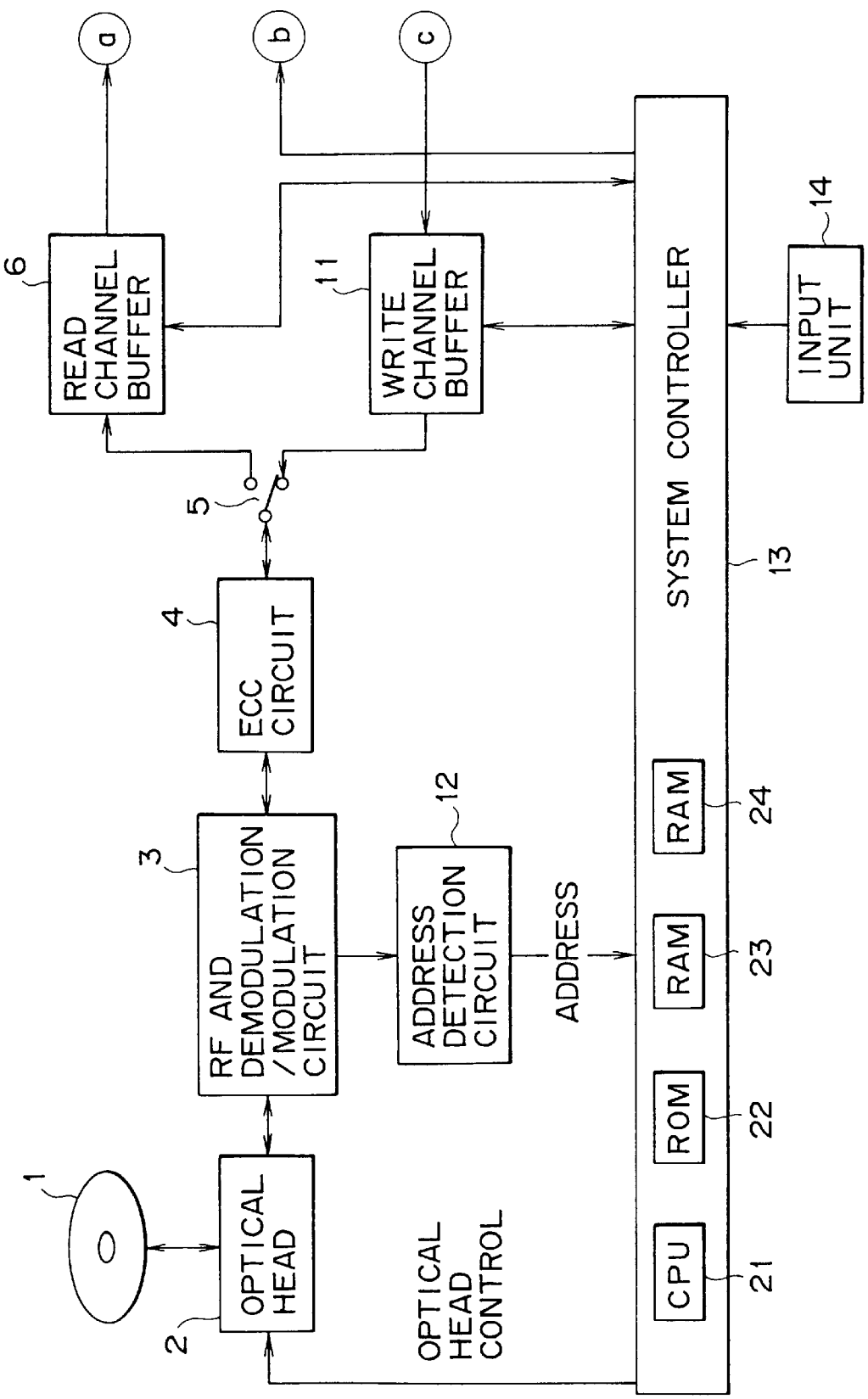
FIG. 25 is a block diagram for illustrating an exemplary structure of an optical disc apparatus to which the present invention is applied.

FIG. 25 shows a structural example of an optical disc apparatus for recording or reproducing information in or from an optical disc which is used as a medium having the file as described herein above. In this optical disc apparatus, one series of optical head 2 is provided correspondingly to one writable optical disc 1, and the optical head 2 is used commonly to data reading and data writing.

A bit stream read out from the optical disc 1 by the optical head 2 is demodulated by an RF and demodulation/modulation circuit 3, subjected to error correction in an ECC circuit 4, and transmitted to a read out channel buffer 6 for absorbing the difference between read out rate and decode processing rate through a switch 5. The output from the read out channel buffer 6 is supplied to a decoder 7. The read out channel buffer 6 is structured so as to be read and written from a system controller 13.

The bit stream supplied from the read out channel buffer 6 is decoded by the decoder 7, and a video and an audio signal are supplied from the decoder 7. The video signal supplied from the decoder 7 is supplied to a synthesis circuit 8, synthesized with an video signal supplied from an OSD (On Screen Display) control circuit 9, supplied from an output terminal P1 to a display not shown in the drawing, and displayed. The audio signal generated from the decoder 7 is transmitted from an output P2 to a speaker not shown in the drawing, and reproduced.

On the other hand, the video signal supplied from an input terminal P3 and the audio signal supplied from an input terminal P4 are encoded by an encoder 10, and transmitted to a write channel buffer 11 for absorbing the difference between the encode processing rate and write rate. The write channel buffer 11 is also structured so as to be read and written from the system controller 13.

Data accumulated in the write channel buffer 11 are read from the write channel buffer 11, supplied to the ECC circuit 4 through the switch 5 to add error correction codes, and thereafter modulated by the RF and demodulation/modulation circuit 3. The signal (RF signal) generated from the RF and demodulation/modulation circuit 3 is written in the optical disc 1 by the optical head 2.

An address detection circuit 12 detects the record in the optical disc 1 or the address information of tracks to be reproduced. A system controller 13 controls operations of respective components of the optical disc apparatus, and provided with a CPU 21 for controlling variously, a ROM 22 for storing processing programs to be executed by the CPU 21, a RAM 23 for storing temporarily data generated in processing steps, and a RAM 24 for storing various information files to be recorded or reproduced in or from the optical disc 1. The CPU 21 performs fine adjustment of the position of the optical head 2 based on the detection result obtained by the address detection circuit 12. The CPU 21 controls switching of the switch 5. An input unit 14 comprising various switches and buttons is operated by a user when various commands are inputted.

Next, basic read operations of the information file is described. For example, when "VOLUME. TOC" information file is read, the CPU 21 of the system controller 13 uses a file system operation command which is incorporated in the processing program previously to define the physical address and the length of the physical address on the optical disc 1 in which "VOLUME. TOC" is recorded. Subsequently, the CPU 21 moves the optical head 2 to the read position based on the address information of the "VOLUME. TOC". The CPU 21 sets the optical head 2, RF and demodulation/modulation circuit 3, and ECC circuit 4 in the reading mode, and switches the switch 5 to the read channel buffer 6 side, further finely adjusts the position of the optical head 2, and thereafter makes the optical head 2 to start reading. Thereby, the content of the "VOLUME. TOC" is read by the optical head 2, demodulated by the RF and demodulation/modulation circuit 3, and subjected to error correction by the ECC circuit 4, and accumulated in the read channel buffer 6.

The CPU 21 stops reading when the data volume accumulated in the read channel buffer 6 becomes equal to or larger than the size of "VOLUME. TOC". Thereafter, the CPU 21 reads the data supplied from the read channel buffer 6 and records it in the RAM 24.

Next, the case that "VOLUME TOC" information file is read is described as an example of the basic information file write operation. The CPU 21 uses the file system operation command incorporated in the processing program previously to find a space area having the size equal to or larger than the "VOLUME. TOC" which is to be written in the file system (optical disc 1), and defines the address.

Next, the CPU 21 transfers "VOLUME. TOC" to be written newly which is ready in the RAM 24 to the write channel buffer 11. Subsequently, the CPU 21 moves the optical head 2 to the write position based on the address information of the space area. The CPU 21 sets the optical head 2, RF and demodulation/modulation circuit 3, and ECC circuit 4 in writing mode, switches the switch 5 to the write channel buffer 11 side, finely adjusts the position of the optical head 2, and thereafter makes the optical head to start writing.

The content of the "VOLUME. TOC" which becomes ready newly is read out from the write channel buffer 11, supplied to the ECC circuit 4 through the switch 5, added with error correction codes, and thereafter modulated by the RF and demodulation/modulation circuit 3. The signal generated from the RF and demodulation/modulation circuit 3 is recorded in the optical disc 1 by the optical head 2. When the data volume recorded in the optical disc 1 becomes equal to the size of "VOLUME. TOC", the CPU 21 stops writing operation.

Finally, the CPU uses the file system operation command incorporated in the processing program previously to rewrite the pointer which points the "VOLUME. TOC" in the file system (optical disc 1) so as to point the position which has been written newly.

Next, the case that a stream, CHUNK_0001. MPEG2 shown in FIG. 1, is reproduced is described as an example of a basic stream reproduction operation. The CPU 21 uses a file system operation command which is incorporated in the processing program previously to define the physical address and the length of the physical address on the optical disc 1 in which "CHUNK_0001.MPEG2" is recorded. Subsequently, the CPU 21 moves the optical head 2 to the read position based on the address information of the "CHUNK_0001. MPEG2". The CPU 21 sets the optical head 2, RF and demodulation/modulation circuit 3, and ECC circuit 4 in the reading mode, and switches the switch 5 to the read channel buffer 6 side, finely adjusts the position of the optical head 2, and makes the optical head 2 to start reading.

The content of the "CHUNK_0001. MPEG2" read out from the optical head 2 is accumulated in the read channel buffer 6 through the RF and demodulation/modulation circuit 3, the ECC circuit 4, and the switch 5. The data accumulated in the read channel buffer 6 is supplied to the decoder 7 to be subjected to decoding processing, and a video signal and an audio signal are generated respectively. The audio signal is generated from the output terminal P2 and the video signal is generated from the output terminal P1 through the synthesis circuit 8.

When the data volume which is read out from the optical disc 1, decoded, and displayed becomes equal to the size of the "CHUNK_0001. MPEG2" or when the stopping of read out operation from the input unit 14 is indicated, the CPU 21 stops reading and decoding processing.

Next, the case that an information file, "CHUNK_0001. MPEG2", is written is described as an example of the basic stream recording operation. The CPU 21 uses a file system operation command which is incorporated in the processing program previously to find an space area having the size equal to or larger than the "CHUNK_0001. MPEG2" which is to be written in the file system (optical disc 1), and defines the address.

The video signal supplied from the input terminal P3 and the audio signal supplied from the input terminal P4 are encoded by the encoder 10, and accumulated in the write channel buffer 11. Subsequently, the CPU 21 moves the optical head 2 to the write position based on the address information of the space area. The CPU 21 sets the optical head 2, RF and demodulation/modulation circuit 3, and ECC circuit 4 in the writing mode, and thereafter makes the optical head 2 to start writing. Thereby, the content of the "CHUNK_0001. MPEG2" which is ready newly is read out from the write channel buffer 11, supplied to the optical head 2 through the switch 5, the ECC circuit 4, and the RF and demodulation/modulation circuit 3, and recorded in the optical disk 1.

When the data volume which has been read out from the write channel buffer 11 and recorded in the optical disc 1 becomes equal to the previously set value or when stopping of write operation is indicated from the input unit 14, the CPU 21 stops write operation. Finally, the CPU 21 uses the file system operation command which has been incorporated in the processing program previously to rewrite the pointer which points the "CHUNK_0001. MPEG2" in the file system (optical disc 1) so as to point the position written newly.

Now, it is assumed that information files and stream files are recorded in the optical disc 1 as shown in FIG. 26. In this example, one program file named as "PROGRAM_001. PGI" is contained. Three title files named as "TITLE_001. VDR", "TITLE_002. VDR", and "TITLE_003. VDR" are contained in this optical disc 1.

Further, in the optical disc 1, two files in the chunkgroup named as "CHUNKGROUP_001. CGIT" and "CHUNKGROUP_002. CGIT" are contained. In addition, three stream files named as "CHUNK_0001. MPEG2", "CHUNK_0011. MPEG2", and "CHUNK_0012. MPEG2" are contained in the optical disc 1, and corresponding information files named as "CHUNK_0001. ABST", "CHUNK_0011. ABST", and "CHUNK_0012. ABST" are recorded in the optical disc 1.

The logic structure of the optical disc 1 having information files and stream files shown in FIG. 26 is shown in FIG. 27. In this example, the chunk information file "CHUNK_001. ABST" specifies the stream file "CHUNK_0001. MPEG2", the chunk information file "CHUNK_0011. ABST" specifies the stream file "CHUNK_0011. MPEG2", and the chunk information file "CHUNK_0012. ABST" specifies the stream file "CHUNK_0012. MPEG2" respectively. In detail, the file ID of the stream is specified in the field namely chunk_file_id in CHUNK_%%%%. ABST shown in FIG. 24.

Further, in this example, the chunkgroup information file, "CHUNKGROUP_001.CGIT", specifies the chunk information file, "CHUNK_0001. ABST", and the chunk information file, "CHUNKGROUP_002. CGIT" specifies the chunk information file, "CHUNK_0011. ABST" and "CHUNK_0012. ABST" respectively. In detail, the file ID of the chunk information is specified in the field namely chunk_info_file_id in the chunk_arrangement_info_info ( ) shown in FIG. 13. The chunk_arrangement_info ( ) is recorded in the chunkgroup information file, the number of chunk_arrangement_info ( ) is equal to the number of chunks which belong to this chunkgroup (the chunk_arrangement_info ( ) shown in FIG. 23 is described in the chunk_connection_info ( ) shown in FIG. 22, and the chunk_connection_info ( ) is described in the CHUNKGROUP_###. CGIT).

There is only one chunk arrangement_info ( ) in CHUNKGROUP_001, and the chunk_info_file_id in it specifies the CHUNK_0001. There are two chunk_ arrangement_info ( ) in CHUNKGROUP_002, and CHUNK_0011 and CHUNK_0012 are specified respectively in it. To process such cases, the chunkgroup can specifies the reproduction order of a plurality of chunks.

In detail, first the initial value of the clock in this chunkgroup is decided using chunkgroup_time_base_offset in CHUNKGROUP_###. CGIT shown in FIG. 21. Next, presentation_start_cg_count and presentation_end_cg_time_count of the chunk_arrangement_info ( ) shown in FIG. 23 are specified when each chunk is registered.

For example, as shown in FIG. 28, it is assumed that the length (time) of CHUNK_0011 is A, and the length (time) of CHUNK_0012 is B. The presentation_start_cg_count of CHUNK_0011 is equal to the chunkgroup_time_base_offset, and the presentation_end cg_count is equal to the chunk_group_time_base_offset+A. The presentation_start_cg_count of CHUNK_0012 is equal to the chunkgroup_time_base_offset+A, and the presentation_end_cg_count is equal to the chunk_group_time_base_offset+A+B. Assuming as described herein above, then CHUNKGROUP_002 is defined as that which is formed by reproducing continuously CHUNK_0011 and CHUNK_0012.

In the case that CHUNK_0011 and CHUNK_0012 overlap each other in reproduction time, the time can be specified to be shifted. Further, by writing in the transition_info ( ) in the chunk_arrangement_info ( ) shown in FIG. 23, special effects (fade-in, fade-out, and wipe) can be specified at the transition between two streams.

In an example in FIG. 26 (FIG. 27), the title information file "TITLE_001. VDR" and "TITLE_002. VDR" indicates the chunkgroup information file "CHUNKGROUP_001. CGIT", and the title information file "TITLE_003. VDR" indicates the chunkgroup information file "CHUNKGROUP_002. CGIT" respectively. In detail, in the title_info ( ) shown in FIG. 16, chunkgroup file ID is specified with the field cgit_file_id, and the time range which defines this title in the chunkgroup is specified with the field title_start_chunk_group_time_stamp and title_end_chunk_group_time_stamp.

For example, in the example shown in FIG. 27, TITLE_001 points the first half of CHUNKGROUP_001 and TITLE_002 points the second half of CHUNKGROUP_001. This division is performed in response to a request from a user, the division position is arbitrary for user and can not be pre-determined. Herein, it is assumed that the position divided by TITLE_001 and TITLE_002 is set at the position A apart from the head of CHUNKGROUP_001.

TITLE_001 specifies CHUNKGROUP_001 as the chunkgroup, specifies starting time of CHUNKGROUP_001 as the starting time of the title, and specifies the time point specified by a user as the ending time of the title.

In other words, chunkgroup_time_base_offset (head position) of CHUNKGROUP_001 is set as title_start_chunk_group_time_stamp of TITLE_001, and chunkgroup_time_base_offset+length of A is set as title_end_chunk_group_time_stamp of TITLE_001.

TITLE_002 specifies CHUNKGROUP_001 as the chunkgroup, the time point specified by a user as the starting time of the title, and the ending time of CHUNKGROUP_001 as the title ending time.

The title_end_chunk_group_time_stamp (head position) of CHUNKGROUP_001 added with length of A is set as title_start_chunk_group_time_stamp of TITLE_002, and the chunkgroup_time_base_offset of CHUNKGROUP_001 added with the length of CHUNKGROUP_001 is set as the title_end_chunk_group_time_stamp of the TITLE_002.

Further, the TITLE_003 specifies CHUNKGROUP_002 as the chunkgroup, specifies the starting time of the CHUNKGROUP_002 as the starting time of the title, and specifies the ending time of CHUNKGROUP_002 as the ending time of the title.

In other words, the chunkgroup_time_base_offset is set as the title_start_chunk_group_time_stamp of the TITLE_003, and the chunkgroup time_base_offset of CHUNKGROUP_002 added with length of CHUNKGROUP_002 is set as the title_end_chunk_group_time_stamp of TITLE_003.

Further, in this example, the program information file "PROGRAM_001. PGI" specifies to reproduce a part of TITLE_001 and a part of TITLE_003 in this order. In detail, the title is specified with title_number in the play_time ( ) shown in FIG. 20, the starting point and ending point are defined by the times defined with each title, thereby one cut is extracted. A plurality of cuts are combined to structure a program.

Next, operation to additionally record (append recording) the new information in the optical disc 1 is described. In detail, this recording is performed by indicating the recording to the optical disc apparatus in real time using timer recording or through user operation of the input unit 14. In the case of the latter, the record ending time can not be predicted if the recording button has been pushed, however the ending time can be predicted if the button for one touch recording function (function to record for a certain time after operation) has been pushed.

Herein, timer recording is described as an example. In this case, it is assumed that a user of the optical disc apparatus has indicated the record starting time, record ending time, bit rate of bit stream, and channel to be recorded previously. Further, it is assumed that the space capacity corresponding to the bit rate and recording time is residually available in the optical disc 1 is confirmed at the time point when the recording is reserved.

In the case that some information is recorded additionally in the optical disc 1 between the record reservation time and actual recording time of the reserved recording, the capacity for recording at the specified bit rate is not secured. In such case, the CPU 21 is controlled so that the bit rate is lowered to a value lower than the specified value and information corresponding to the reserved time is recorded, or so that the bit rate is not changed and information corresponding to the recordable time is recorded. Of course, the CPU 21 generates a message to the user for telling the situation at the time point when the additional information is recorded and a possible failure in the reserved recording becomes clear.

When the starting time of the reserved recording comes close, the CPU 21 resumes automatically the mode from sleep mode to operation mode using the built-in timer and clock. The CPU 21 secures the area which is sufficient for the reserved recording on the optical disc 1 using the file system operation command incorporated in the processing program previously. In detail, the value which is formed by multiplying the result (recording time) of subtraction of the starting time from the ending time of the reserved recording by the bit rate corresponds to the size of area required to record the reserved program, the CPU 21 first secures the area of this size. Alternatively, in the case that the information file other than stream file is required to be recorded when recording, for example, in the case that a title information file is required to be recorded as a new title, it is required to secure a capacity which is sufficient for recording these information files on the optical disc 1. If the sufficient area can not be secured, any of the above-mentioned methods (bit rate change, recording only for a recordable time) is selected.

At this time, because it is the record to have a new title, a user gives a new stream file name as a new stream file in a new stream directory. Herein, it is assumed that this is ¥MPEGAV¥STREAMS_003¥CHUNK_0031. In detail, the file name of CHUNK_0031. MPEG2is given under STREAM_003 directory, under MPEGAV directory, under the root directory as shown in FIG. 29.

The CPU 21 commands the execution of the recording mode to the respective units. For example, a video signal supplied from a tuner not shown in the drawing to the input terminal P3 and an audio signal supplied to the input terminal P4 are encoded by the encoder 10, and accumulated in the write channel buffer 11. Subsequently, the CPU 21 moves the optical head 2 to the write position based on the address information of the area which has been secured previously. The CPU 21 sets the optical head 2, RF and demodulation/modulation circuit 3, and ECC circuit 4 in the write mode, and switches the switch 5 to the write channel buffer 11 side, finely adjusts the position of the optical head 2, and makes the optical head 2 to start writing. Thereby, the content of "CHUNK_0031. MPEG2" which is newly prepared is read out from the write channel buffer 11, and recorded in the optical disc 1 through the switch 5, the ECC circuit 4, the RF and demodulation/modulation circuit 3, and the optical head 2.

The above-mentioned write operation is continued, and the CPU 21 stops writing when any one of conditions described herein under appears.

1) The time reaches the ending time of the reserved recording.
2) Recording can not be continued in the optical disc 1 due to deficient capacity and other causes.
3) Command to stop recording operation is generated.

Next, the CPU 21 rewrites the pointer which points "CHUNK_0031. MPEG2" in the file system to a value which points the position where a new pointer is written. Further, the CPU 21 prepares respective files of the chunk information, chunkgroup information, and title information, and gives names respectively and stores them. It is required that the space capacity which is sufficient for recording these files is secured in the optical disc 1 when recording or reserving.

As described herein above, new files are generated as shown, for example, in FIG. 30. In the drawing, file names having an asterisk (*) at the upper right corner indicates files which have been generated this time.

Figure 31:
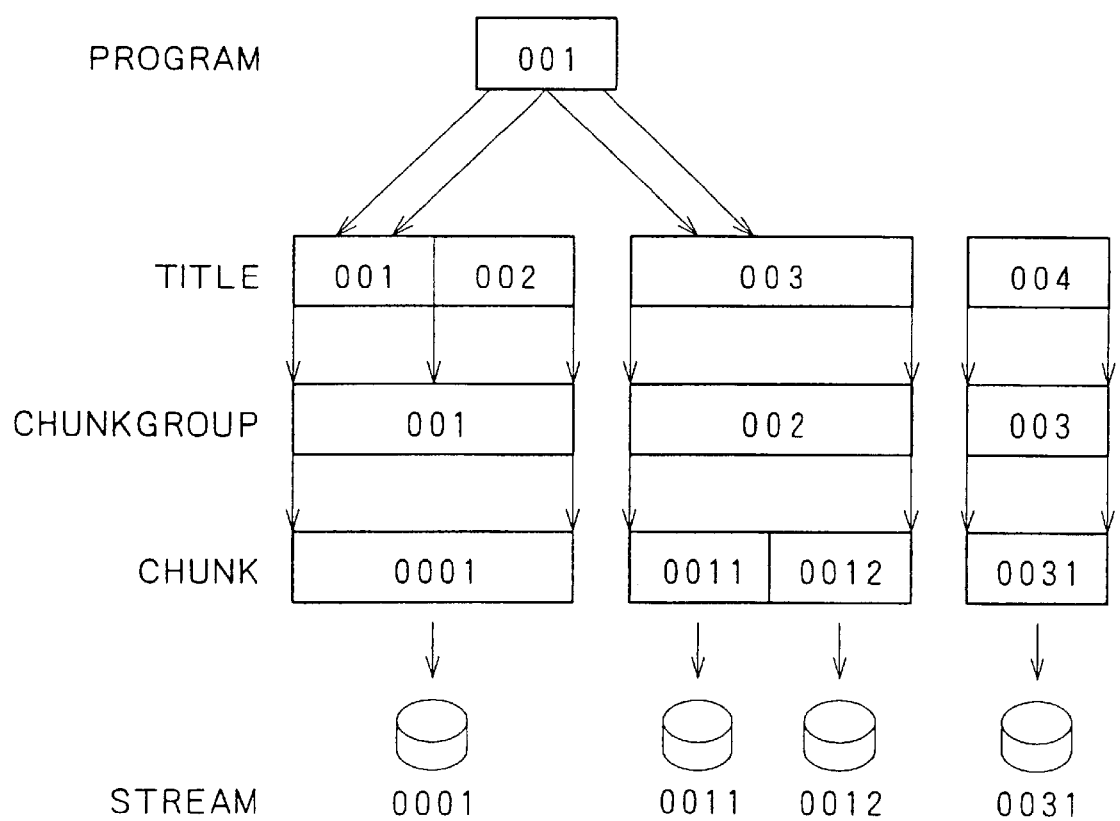
FIG. 31 is a diagram for describing the logic structure of the directory.

FIG. 31 shows the relation of newly formed information files. TITLE_004 specifies CHUNKGROUP_003, CHUNKGROUP_003 specifies CHUNK_0031, and CHUNK_0031 specifies STREAM_0031.

In detail, the new stream is registered in the information file as TITLE_004. The user can recognize the attribute of TITLE_004 by way of function for confirming the title of the optical disc apparatus, and can reproduce TITLE_004.

Next, operation of overwrite recording on the optical disc 1 as shown in FIG. 26 (FIG. 27) is described. Overwrite recording is an operation in which a new program is recorded on the program which has been recorded (at this time, the existing program is erased) as in the case that signals are recorded on a video tape.

In overwrite recording, the position where overwrite recording starts is important. For example, it is assumed that a user indicates to start overwrite recording from the head of TITLE_001. At this time, the overwrite recording proceeds with rewriting TITLE_001, TITLE_002, and TITLE_003 respectively in this order. If the recording operation does not yet end when TITLE_003 has been rewritten to the tail, then a new area is secured in the space area of the optical disc 1 and the recording is continued. For example, if TITLE_002 is the record starting position, then TITLE_002 is not rewritten in this recording operation because TITLE_001 positioned before the record starting position.

Now it is assumed that overwrite recording is performed from the head of TITLE_003 by way of timer recording. In this case, it is assumed that a user of the optical disc apparatus has specified previously the record starting time and ending time, the bit rate of bit stream, and the channel to be recorded. Further, it is assumed that the head of TITLE_003 has been specified as the record starting position, which is important in overwrite recording. Yet further it is assumed in this case also that the capacity sufficient for the bit rate and recording time has been confirmed previously in the optical disc 1 when the recording was reserved. In the case of overwrite recording, the sum of the total capacity of rewritable (a plurality of) titles following from the specified position and the space capacity of the optical disc 1 is the recordable capacity. In other words, in this case, the sum of the total capacity of STREAM_0011 and STREAM_0012 which are streams managed by TITLE_003 and the space capacity of the optical disc 1 is the recordable capacity.

In overwrite recording, there are some choices in selecting order of stream for recording in the recordable capacity. The first method is a method in which the order of streams is specified by the title. In detail, in this case, the recording is started from the head of STREAM_0011, and when STREAM_0011 is recorded to the tail, then STREAM_0012 is recorded from the head, and when STREAM_0012 is recorded to the tail, then information is recorded in the space area. Another method is an method in which first the space area is recorded, and when all the space area is fully recorded, then the existing stream is recorded.

The former method is advantageous in terms of emulation of video tape. In other words, this method is characterized in that users can understand easily because this is the same operation as that for video tape. The latter method is characterized in that the method is excellent in protection of the recorded information because the existing recorded stream is erased later.

In the case that additional recording is performed in the optical disc 1 between the time when the recording reservation was set and the time when the reserved recording is executed actually, it can happen that the capacity for recording the reserved program at the specified bit rate is not secure. In this case, in the same manner as described herein above, the bit rate is lowered automatically and recording is executed over the reserved time, alternatively recording is executed during the available time with keeping the bitrate unchanged.

When the starting time of the reserved time comes close, the optical disc apparatus resumes from sleeping mode to operating mode. The CPU 21 secures all the space capacity in the optical disc 1. Of course, the space capacity maybe secured when it is needed in stead of securing the space capacity at that timing, but herein for the purpose of description, it is assumed that the required area is secured before starting of the recording.

In the case that the size of required area is known based on starting time, ending time, and bit rate specified by the timer recording, the required capacity (or with additional some margin) may be secured. When it is required to record an information file for the recording, for example, a title information file is necessary because the information is registered as a new title, it is required that the capacity for recording the information file should be secured.

Herein, a file name is given to the new stream file as a new stream file in a new stream directory. In detail, the file name of ¥MPEGAV¥STREAMS_002¥CHUNK_0031 is given. In detail, as shown in FIG. 32, a file is named as CHUNK_0031. MPEG2under STREAM_002 directory, under MPEGAV directory, under the root directory.

The video signal supplied to the input terminal P3 and the audio signal supplied to the input terminal P4 are encoded by the encoder 10, and accumulated in the write channel buffer 11. Subsequently, the CPU 21 moves the optical head 2 to the write position based on the address information of the area which was secured previously. The CPU 21 sets the optical head 2, RF and demodulation/modulation circuit 3, and ECC circuit 4 in writing mode, and switches the switch 5 to the write channel buffer 11 side, the position of the optical head 2 is finely adjusted, and thereafter the optical head 2 starts writing. Thereby, the content of CHUNK_0031. MPEG2which is prepared newly is read out from the write channel buffer 11, and recorded in the optical disc 1 through the switch 5, ECC circuit 4, RF and demodulation/modulation circuit 3, and optical head 2.

At this time, the first stream file "CHUNK_0011. MPEG2" is rewritten. When the recording is executed to the tail of "CHUNK_0011. MPEG2", next, the recording proceeds to "CHUNK_0012. MPEG2", and further proceeds continuously to CHUNK_0031. MPEG2.

The CPU 21 continues the above-mentioned operation, and as in the case described herein above, when any one of the three conditions occurs, the CPU 21 stops writing.

Next, the CPU 21 uses the file system operation command incorporated previously in the processing program to update the stream file, the chunk information, the chunkgroup information, and the title information.

The file structure depends on the write end timing. For example, in the case that after two streams namely CHUNK_0011. MPEG2and CHUNK_0012. MPEG2are completely overridden and subsequently the recording is continued on CHUNK_0031. MPEG2, the file structure in the optical disc 1 is shown in FIG. 33. Asterisks (*) given at the upper right corner of file names indicates that those files are newly recorded files.

Figure 34:
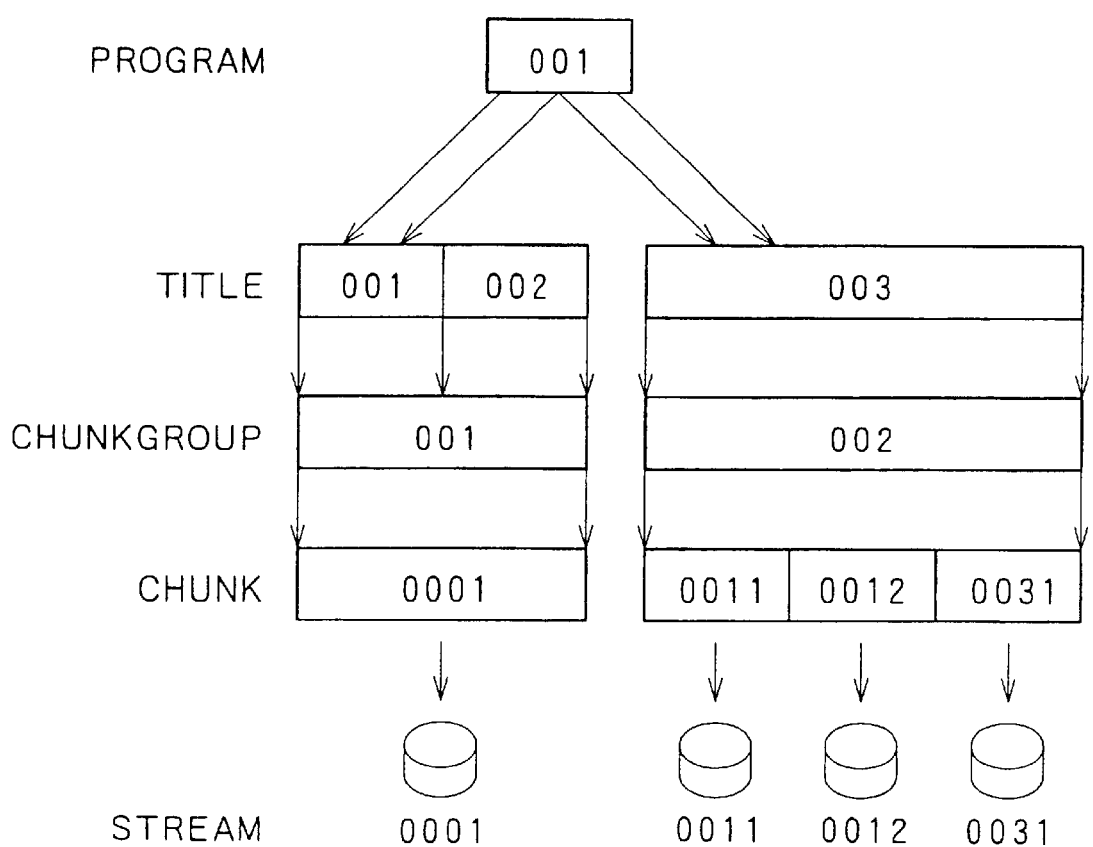
FIG. 34 is a diagram for describing the logic structure of the directory.

FIG. 34 shows the relation of files (files shown in FIG. 33) which have been recorded as described herein above. In comparison with FIG. 31, CHUNK_0031 is incremental in CHUNK contained in CHUNKGROUP_002 specified by TITLE_003, and CHUNK_0031 specifies STREAM_0031.

Figure 35:
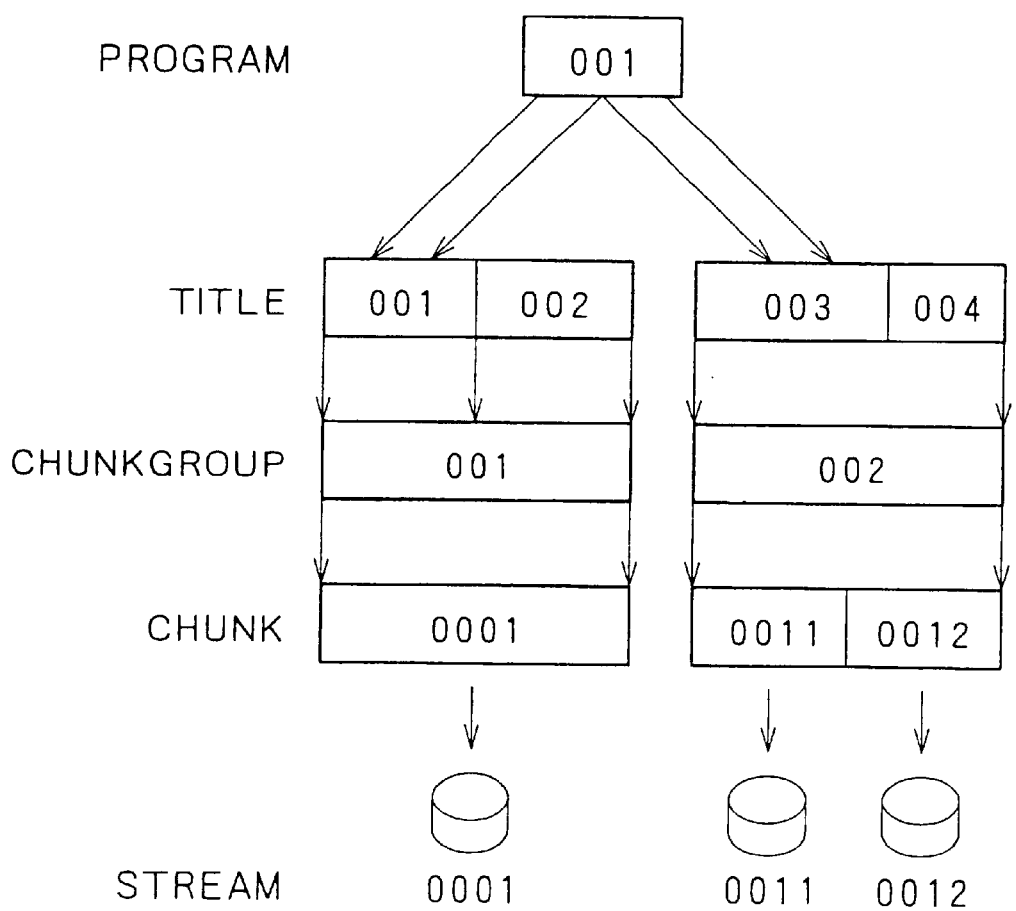
FIG. 35 is a diagram for describing the logic structure of the directory.

On the other hand, in the case that the overwrite recording ends in the middle of overwriting on the existing stream, for example, in the case that the overwrite recording ends in the middle of recording on CHUNK_0011, the stream of CHUNK_0031 which has been secured for overwriting is released because of no overwriting. In this case, a special title processing is performed. In detail, in the case that the overwrite recording starts from the head of TITLE_003 and ends in the middle, the title is divided at the point. As shown in FIG. 35, the area from the overwrite recording starting position to the ending position is contained in the new TITLE_003, and the following area (residual area of the original TITLE_003) is contained in TITLE_004.

Next, operation of title reproduction is described. It is assumed that an optical disc 1 having files shown in FIG. 26 is inserted into the optical disc apparatus to reproduce the title. First when the optical disc 1 is inserted, the CPU 21 reads out the information files from the optical disc 1, and stores them in RAM 24. This operation is performed by repeating reading operation of the basic information file described herein above.

The CPU 21 reads first VOLUME. TOC and ALBUM. STR. Next, the CPU 21 counts the number of files having the escape identifier of "VDR" under the directory "TITLE". The files having this escape identifier are files which contain the title information, and the number of files is equal to the number of titles. In the example shown in FIG. 26, the number of tiles is 3. Next, the CPU 21 reads three title information files and stores them in RAM 24.

The CPU 21 controls the OSD control circuit 9 to generate the character information for indicating the title information recorded in the optical disc 1, and the character information is combined with the video signal in the synthesis circuit 8 and the synthesized information is supplied from the output terminal P1 to a display for displaying. In this case, the existence of three titles, the length and the attribute (name, date and time of recording) of these three respective titles are displayed.

Herein, it is assumed that a user specifies reproduction of TITLE_002. In the information file of TITLE_002 (in the cgit_file_id in the title_info ( ) shown in FIG. 16), the file ID for specifying CHUNKGROUP_001 is recorded, and the CPU 21 stores this file and also stores CHUNKGROUP_001 in RAM 24.

Next, the CPU 21 checks that the starting time and ending time of TITLE_002 (title_start_chunk_group_time_stamp and title_end_chunk_group_time_stamp in title_info ( ) in FIG. 16) correspond respectively to which CHUNK. This check is performed by comparing information (presentation_start_cg_time_count and presentation_end_cg_time_count in chunk_arrangement_info ( ) shown in FIG. 23) in which CHUNK is registered. In this case, as shown in FIG. 27, it is understood that the starting time of TITLE_002 is contained in the middle of CHUNK_0001. In other words, it is understood that in order to reproduce TITLE_002 from the head, the reproduction may be started from the middle of stream file "CHUNK_0001. MPEG2".

Next, the CPU 21 checks the position in the stream which corresponds to the head of TITLE_002. In detail, the starting time of TITLE_002 which corresponds to how many offset time (time stamp) in the stream is calculated, and next the reproduction starting point positioned just before the starting time is specified using the characteristic point information in CHUNK file. Thereby, the offset distance from the head of the reproduction starting point file is defined.

Next, the CPU 21 defines the physical address and the length of the physical address in the optical disc 1 in which "CHUNK_0001. MPEG2" is recorded using the file system operation command in which the processing program is incorporated previously. Further, the offset address of the reproduction starting point obtained just before is added to this address, and the address of reproduction starting point of TITLE_002 is finally defined.

Subsequently, the CPU 21 moves the optical head 2 to the reading out position based on the address information of the "CHUNK_0001. MPEG2". The CPU 21 sets the optical head 2, RF and demodulation/modulation circuit 3, and ECC circuit 4 in the reading out mode, and switches the switch 5 to the read out channel buffer 6 side, the position of the optical head 2 is finely adjusted, thereafter the optical head 2 starts reading. Thereby, the content of "CHUNK_0001. MPEG2" is accumulated in the read out channel buffer 6.

The data accumulated in the read out channel buffer 6 is supplied to the decoder 7 to be decoded, and a video signal and an audio signal are generated. When the quantity of data which are readout from the optical disc 1, decoded, and displayed becomes equal to the size of "CHUNK_0001. MPEG2", the CPU 21 is switched over to reproduction of TITLE_003. The reproduction operation of TITLE_003 is the same operation as the reproduction operation of TITLE_002.

When the registered title is reproduced completely or when read out operation is indicated to be brought to a stop, the reading out and decoding are brought to a stop.

When a new disc is inserted to the optical disc apparatus as the optical disc 1, or when a disc of different format is inserted, the CPU 21 tries to read out VOLUME. TOC and ALBUM. STR when a disc is inserted, however, there is no such file in the disc. In this case, that is, in the case that VOLUME. TOC and ALBUM. STR can not be read out, the CPU 21 generates a message to request an indication from a user. The user indicates to the CPU 21 any of operations, namely, ejection of the optical disc 1 (for example, in the case that this disk is of different format), initialization (for example, in the case that a new disc of the same format), and resumption of data by any procedure (for example, in the case that the disc is a disk of the same format but data is destroyed).

An optical disc apparatus 51 shown in FIG. 36A and B records video signals compressed according to MPEG2system (referred to as compressed video signals) which are supplied from digital satellite broadcast in a recordable optical disc 71, and reproduces the video signal recorded in the optical disk 71.

The optical disc apparatus 51 is provided with a first input terminal 52 for receiving base band digital video signals (or analog video signals) which are not compressed, a second input terminal 53 for receiving compressed video signal which are compressed according to MPEG2system from a receiving apparatuss 72 for digital satellite broadcast, an encoder 54 for compressing according to MPEG2system the digital video signal supplied through the first input terminal 52 as it is or analog signals after A/D conversion, a descramble circuit 55 for descrambling digital satellite broadcast video signals supplied through the second terminal, and an MPEG decoder 56 for expanding compressed video signals which has been descrambled by the descramble circuit 55.

The optical disc apparatus 51 is provided additionally with a characteristic point detection circuit for detecting characteristic points of un-compressed base band digital video signals (if an input signal is an analog video signal, then the signal is subjected to A/D conversion and a characteristic point is detected) which are supplied from the first input terminal 52 or the MPEG decoder 56, an multiplexing circuit 58 for multiplexing the compressed video signals generated from the encoder 54 or descramble circuit 55 and the characteristic point file generated from the characteristic point detection circuit 57, and an recording circuit 59 for recording compressed video signals which have been multiplexed by the multiplexing circuit 58 in the optical disc 71.

The optical disc apparatus 51 is further additionally provided with a reproduction circuit 60 for reproducing compressed video signals and characteristic point files recorded in an optical disc 71, a separation circuit 61 for separating reproduced video signals and characteristic point files, an MPEG decoder 62 for decoding separated video signals according to MPEG2system, and a control circuit 63 for performing reproduction control of the reproduction circuit 60 based on separated characteristic point files.

The optical disc apparatus 51 is yet additionally provided with an operation input unit 64 for being operated by a user and a monitor 65 for displaying based band video signals supplied from the first input terminal, the MPEG decoder 56, and MPEG decoder 62 as dynamic images.

The first input terminal 52 receives a normal un-compressed digital video signal from, for example, a digital video tape recorder. The normal un-compressed digital video signal supplied to the first input terminal 52 is compressed by the MPEG encoder 54 according to the MPEG2system, and supplied to the multiplexing circuit 58. The normal un-compressed digital video signal supplied to the first input terminal 52 is also supplied to the characteristic point detection circuit 57.

The second input terminal 53 receives a compressed video signal compressed according to the MPEG2 system from, for example, a digital satellite broadcast receiving apparatus 72. The compressed video signal supplied to the second input terminal 53 is descrambled by the descramble circuit 55 using a key code. The descrambled compressed video signal is supplied to the multiplexing circuit 58. The descrambled compressed digital video signal is supplied also to the MPEG decoder 56, subjected to expansion processing therein, and supplied to the characteristic point detection circuit 57.

The characteristic point detection circuit 57 detects a characteristic point information from the video signal when the un-compressed base band video signal is supplied and generates a characteristic point file.

Herein the characteristic point of a video signal is defined as a head finding point used for reproduction or edition of video signals, for example, a scene switching frame, or a frame positioned at starting or ending point of a program. The characteristic point may be a head picture of GOP in MPEG or I picture, or a frame having a sound larger than a certain magnitude or smaller than a certain magnitude (large sound or mute sound). When a characteristic point is detected using GOP and sound in MPEG, the needed information is supplied to the characteristic point detection circuit 57.

In a characteristic point file, the information which correlates the type of the above-mentioned characteristic point to the record position of the characteristic point in the optical disc 71 is contained. The record position of the characteristic point in the optical disc 71 is, for example, a sector address.

Alternatively, the characteristic point may be also specified by a user. For example, a user operates the operation input unit 64 to specify a characteristic point during real time recording, and at this time, the characteristic point detection circuit 57 detects the operated input and generates a characteristic point information.

The characteristic point detection circuit 57 supplies the generated characteristic point file to the multiplexing circuit 58.

The multiplexing circuit 58 multiplexes the characteristic point file on the compressed video signal compressed according to MPEG2 system supplied from the descramble circuit 55 or the MPEG encoder 54. The multiplexed compressed video signal obtained from the characteristic point file is subjected to addition of error correction codes and modulation according to a prescribed modulation system in the recording circuit 59, and thereafter recorded in the optical disc 71.

The multiplexing circuit 58 multiplexes the characteristic point file on the compressed video signal and also multiplexes caption codes and audio data simultaneously. Alternatively, the multiplexing circuit 58 may multiplexes the characteristic point file by recording the characteristic point file on a management information area such as TOC of the optical disc 71, or may records the characteristic point file in other recording media such as a built-in memory of the optical disc apparatus 51 or a memory card instead of multiplexing the characteristic point file on the compressed video signal.

As described herein above, the optical disc apparatus 51 can record the compressed video signal supplied by the way of digital satellite broadcast in the form of bit stream as it is in the optical disc 71. The optical disc apparatus 51 can detect the characteristic point of the video signal to be recorded and record the characteristic point with the compressed video signal as a characteristic point file. Therefore, the optical disc apparatus 51 records the video signal without deterioration of the image quality, and further the optical disc apparatus 51 is capable of random access to the recorded video signal.

On the other hand, the reproduction circuit 60 performs demodulation and error correction processing to reproduce the compressed video signal and characteristic point file recorded in the optical disc 71.

The reproduced compressed video signal and characteristic point file is separated respectively by the separation circuit 61. The separated compressed video signal is subjected to decode processing in the MPEG decoder 62, and supplied to the monitor 65. The separated characteristic point file is supplied to the control circuit 63.

The control circuit 63 controls the reproduction circuit 60 based on the characteristic point file information and the operation input information supplied from the operation input unit 64. For example, the control circuit 63 takes a random access to the optical disc 71 based on the characteristic point information indicated in the characteristic point file and the sector address where the characteristic point is recorded. The reproduction circuit 60 performs, for example, skip reproduction, in which characteristic point frames indicated in the characteristic point file is reproduced successively, or performs head finding reproduction to find a desired scene change frame.

Alternatively, if the characteristic point file is recorded, for example, in TOC of the optical disc 71, then the control circuit 63 displays the information indicated in the characteristic point file on the monitor 65, a user confirms the displayed content, and the desired program is reproduced from the head.

The above-mentioned MPEG decoder 62 is shown as a circuit independent from the MPEG decoder 56 for the purpose of convenience for description, however, one circuit may be used selectively for recording and reproducing.

As described herein above, the optical disc apparatus 51 can reproduce the compressed video signal recorded in the optical disc 71 without deterioration of image quality, and can take random access to the recorded video signal.

By the way, the optical disc apparatus 51 can generates a new characteristic point file during reproduction. In detail, in the optical disc apparatus 51, an output from the MPEG decoder 62 used for reproduction is supplied to the characteristic point detection circuit 57, and a characteristic point file is generated from the base band video signal obtained during the reproduction. The characteristic point detection circuit 57 supplies the characteristic point file generated during the reproduction to the control circuit 63, and stores the characteristic point file in the built-in memory. The control circuit 63 may control reproduction of the optical disc 71 based on the characteristic point file stored separately in the memory.

In the case that the characteristic point file is generated during reproduction, the characteristic pint of only the recorded portion is detected out of the recorded video signal. However, for example, if a high speed decoder having a processing speed as high as 4 times or 8 times the reproduction speed is used as the MPEG decoder 62, then the characteristic point file can be generated before reproduction because of read ahead.

The optical disc apparatus 51 multiplexes the characteristic point file generated during reproduction on the video signal when reproduction is completed or interrupted, and records the characteristic point file in the optical disc 71. Alternatively, it may be stored differently in the memory of the control circuit 63 provided in the optical disc apparatus 51.

FIG. 37 shows accumulation and recording processing of the characteristic point information. First in the step S1, the control circuit 63 determines whether the input signal is an analog signal, and if the input signal is an analog signal, then the sequence proceeds to the step S2, the data of 1 GOP is encoded by the MPEG encoder 54. The encoded bit stream is recorded in the optical disc 71 as a file through the multiplexing circuit 58 and recording circuit 59. At this time, the control circuit 63 controls the characteristic point detection circuit 57 so as to detect the characteristic point of the input video signal supplied from the terminal 52. Next, the sequence proceeds to the step S3, the control circuit 63 stores the characteristic point which is detected by the characteristic point detection circuit 57 in the step S2 in the built-in memory. Further in the next step S4, the control circuit 63 determines whether a user indicates the end of recording, and if the end of the recording is not indicated, then the sequence returns to the step S2, and the following processing is performed repeatedly. If the recording operation is judged as it is ended in the step S4, the sequence proceeds to the step S13.

On the other hand, if the input signal is not an analog signal, then the sequence proceeds to the step S5, the control circuit 63 determines whether the input signal is a bit stream encoded according to the MPEG2 system. If the input signal is a video stream encoded according to the MEPG2 system, then the sequence proceeds to the step S6, and the control circuit 63 parses the video data of 1 GOP. In detail, the control circuit 63 controls the MPEG decoder 56 so as to decode necessary information as the characteristic point information such as GOP starting point of the bit stream, picture type, and length from the header information contained in the bit stream. The characteristic point detection circuit 57 detects the characteristic point information from the information decoded by the MPEG decoder 56. The input signal is recorded in the file.

Next, the sequence proceeds to the step S7, the control circuit 63 stores the characteristic point information detected by the characteristic point detection circuit 57 in the built-in memory. At this time, because the video stream which has been stored is already encoded according to the MPEG2 system, the MPEG encoder 54 supplies the input bit stream to the multiplexing circuit 58 as it is, and records the bit stream in the optical disc 71 through the recording circuit 59.

In the step S8, the control circuit 63 determines whether the end of the recording operation is commanded, and if the result is NO, the sequence returns to the step S6, and the following processing is executed repeatedly. In the step S8, if the result is YES, the sequence proceeds to the step S13.

On the other hand, in the step S5, if the input signal is determined to be an video stream not encoded according to the MPEG2 system, then the sequence proceeds to the step S9, and the control circuit 63 determines whether the video signal can be parsed (the structure of the video signal can be detected). If the result is YES, then the sequence proceeds to the step S10, the control circuit 63 parses the video signal of one access unit. In detail, the control circuit 63 controls the MPEG decoder 56 to decode the input video stream (therefore, the MPEG decoder 56 is capable of functioning to decode data which are encoded according a system other than the MPEG2 system in addition to data encoded according to the MPEG2 system), and supplies the decoded video stream to the characteristic point detection circuit 57 based on the header information to detect the characteristic point. At this time, the input video stream passes the MPEG encoder 54 as it is, and is recorded in the file in the optical disc 71 through the multiplexing circuit 58 and recording circuit 59. Further in the step S11, the characteristic point information is stored in the built-in memory. In the step S12, the control circuit 63 determines whether the end of the recording operation is commanded, and if the result is NO, then the sequence returns to the step S10, and the following processing is performed repeatedly. In the step S12, the determined result is YES, then the sequence proceeds to the step S13.

In the step S13, the control circuit 63 supplies the characteristic point information stored in the built-in memory to the characteristic point detection circuit 57 to generate a file, and stores it as the file in the optical disc 1 through the multiplexing circuit 58 and recording circuit 59.

In the step S9, if the determined result is NO, then the control circuit 63 brought the recording operation to an end.

The characteristic point information will be described herein under in detail. Two purposes of introduction of the characteristic point file is described herein under.

Reduce access time during variable speed reproduction to realize faster variable reproduction.
Not embed the information in a stream to reduce the load during recording.
By achieving these purposes, the following effect is expected.
MPEG2 video stream is edited in frame accuracy.
Switching between two streams during reproduction is performed smoothly (seamless reproduction).

The characteristic point information is an arrangement of extracted necessary information for each small unit of the bit stream. The small unit is determined with matching to the characteristic of the bit stream, for example, in the case of an MPEG video stream, 1 GOP corresponds to the small unit, and in the case of audio, 1 audio frame corresponds to the small unit. In this case, the characteristic point information includes the information such as the relative number of bytes from the file head located at the starting position of each GOP and audio frame and the reproduction time.

The optical disc apparatus 51 accumulates temporarily the extracted characteristic point information in the memory and finally records it in the optical disc 1. If the file in which the characteristic point information is recorded has been lost, it is possible to re-structure it by parsing the stream. If there is no characteristic point information file or the characteristic point information can not be generated, then the reproduction is performed without using the characteristic point information. In this case, the reproduction is partially limited. For example, only the normal reproduction from the chunk head is possible, or un-natural connection between chunks at switching can happen to occur.

The detailed characteristic point information is shown in FIG. 24 as described herein above. The CHUNK_%%%%.ABST is a file in which the characteristic point extracted from the bit stream which is the component of the chunk of sub_file number %%%% is recorded. In this file, the starting byte position, length, and attribute are described for each bit stream unit structure such as GOP or audio frame. GOP information and audio frame information are collected for each chunk (sub_file) as 1 CHUNK_%%%%. ABST.

file_type_id is structured as shown in FIG. 38, this is an identifier for representing that this is a file in which the characteristic point information is recorded, and represented with a character string having 16 characters according to ISO-646.

info_type represents the type of subsequent stream_info, and specifies the type of stream as shown in FIG. 39.

cognizant_recording_indicator shown in FIG. 40 represents whether this chunk is recorded by a recording apparatus which is capable of understanding and updating CCI (Copy Control Information).

number_of_programs represents the number of programs contained in TS (Transport Stream), and it is necessary to read PSI (Program Specific Information) for recognizing the number. If the number_of_programs is the number other than TS, then the value is 1.

number_of_streams represents the number of streams used in this program, if the number is the number of TS, then the value is the number of different PID (packet identification). If the stream is the MPEG stream other than TS, the number of streams having a different stream id is loaded in this place.

stream_identifier represents a stream id, and in the case of TS, PID is used as the stream id.

slot_unit_type shown in FIG. 41 indicates division methods which have been used when the stream is divided with a certain interval. In the case that the index of division is the time such as each frame and field, the time stamp is used.

slot_time_length represents the time which corresponds to 1 slot, and is represented with a value of a time stamp which uses 90 kHz counter.

number of slots represents the number of slots which are written in the table.

number_of_thinned_out_slots represents the number of slots which are thinned out, and the value of 0 indicates that all the slots represented with slot unit type are recorded in this file. The slot which is generated first for each stream can not be shinned out.

text_block ( ) is an area where various texts are stored, only the text item which is permitted to be used in files which contain the text_block ( ) is described.

bitstream_attribute ( ) represents the elementary stream of the MPEG or attribute of each video and audio stream other than MPEG. The syntax is represented in FIG. 42.

bitstream_attribute_id shown in FIG. 43 is an identifier which indicates that bitstream_attribute ( ) starts from this position, and is represented with a character string having 16 characters according to ISO-646.

bitstream_attribute_length is contained in bitstream_attribute ( ), and represents the length of data byte which is subsequent to the field of bitstream_attribute_length.

attribute_type represents the type of attribute which is subsequent next as shown in FIG. 44.

video_attribute ( ) is collected for each stream of the video. Because chunk unit is a continuous streams, the attribute is determined for each unit.

Syntax of video_attribute ( ) is shown in FIG. 45.

input_video_source represents the type of input source as shown in FIG. 46.

video_compression_mode represents the method for encoding the video such as MPEG1 video, MEPG2 video and DV as shown in FIG. 47.

picture_rate represents the sampling time period of 1 picture as shown in FIG. 48, and represents the shortest time period of the picture regardless of picture scan type.

picture_scan_type represents which method out of a method in which 1 picture is recorded progressively and a method in which picture is recorded in interlace is used. The display method is a problem of mounting.

vertical_lines represents the number of scanning line as shown in FIG. 50.

horizontal_active pixels represents the effective pixels in the horizontal direction.

aspect_ratio represents the aspect ratio as shown in FIG. 51.

pixel_ratio represents the squareness of the pixel (1:1 or 1:1.25) as shown in FIG. 52.

CC_existence represents the existence of Closed Caption as shown in FIG. 53.

recording_mode represents recording mode of VDR (SP (Standard Play) or LP (Long Play)) as shown in FIG. 54.

copyright_information represents the copyright information.

audio_attribute ( ) is an area where the attribute of audio stream is recorded, and an arrangement of constant attribute in the chunk for each stream ID. In the case that a plurality of audio streams having the same stream ID is recorded in different times, all the audio streams should have the same attribute. Each channel in 1 audio stream has the same coding mode, quantization bit, and sampling frequency. Syntax of audio_attribute ( ) is shown in FIG. 55.

number of audio streams represents the total number of streams which are regarded as audio streams recorded in the chunk, and means the number of audio streams having different stream id. The audio stream is regardless of the starting position (the starting position is referred to the characteristic point file).

stream_id represents the stream id of the addressed audio stream.

sub_stream_id represents the id which assists in determining the addressed audio stream.

language_code represents a language code of the stream and is written according to ISO639-2.

input_source represents the input source of the stream as shown in FIG. 56. If it is unknown, then it is written as "0000b".

audio_coding_mode represents the coding mode of the audio stream as shown in FIG. 57.

bitrate represents fixed or variable bit rate as shown in FIG. 58.

q_bit represents the number of quantization bits (24, 20, 16, 12, etc.) as shown in FIG. 59.

fs represent the sampling frequency of the audio stream as shown in FIG. 60.

emphasis represents the flag of emphasis as shown in FIG. 61, and is effective for LPCM stream.

number_of channels represents the number of channels (1 (mono) to 8).

status_of_this_channel represents the state of channel and represents whether channels used for overflow record is residual, for example, represents the space channel.

channel_assignment represents that what channel is assigned to what speaker (L. R. Center, Rear, L, Rear R, , , ) and is effective for LPCM stream.

Dynamic_range_control is represents Dynamic range control.

karaoke ( ) represents karaoke related data.

slot_info ( ) is formed by dividing a stream into units specified by slot_type, an by extracting the characteristic of the stream for each small unit (slot). slot_info ( ) is used selectively for each type of stream.

Syntax of slot_info ( ) is shown in FIG. 62.

slot_info_id is an identifier which indicates the position from which slot_info ( ) starts as shown in FIG. 63, and is represented with a character string having 16 characters according to ISO 646.

Syntax of slot_info_for_one_GOP ( ) is shown in FIG. 64. slot_info_for_one GOP ( ) is the characteristic extracted from the MPEG video stream, and the basic slot unit is 1 GOP.

slot_info_one_GOP ( ) is repeated the number of times equivalent to the number of GOP in the stream.

slot_start_point used hereinafter represents the head position of a slot, and is arranged in byte align. Head bytes of all the GOP headers in the stream should be slot_start_point. Further, the head byte of the picture header of I-picture may be slot_start_point.

slot_length represents the length from this slot_start_point to the next slot_start_point in the form of byte, and in the case of the first stream or final stream, slot_length represents the length from the head or tail respectively.

(in case of "info_type ==MEPG1_System_stream")

sequence_header_start_offset indicates the first byte of Sequence header which is located before the addressed slot_start_point bit position and is located nearest to slot_start_point. The value is represented with the absolute value of the relative number of bytes from slot_start_point.

packet_start_offset indicates the head byte of the packet header of a packet which contains the byte position indicated by sequence_header_start_offset. The value is represented with the absolute value of the relative number of bytes from slot_start_point.

sequence_header_start_offset indicates the first byte of the sequence header which is located before the addressed slot_start_point bit position and is located nearest to the slot_start_point. The value is represented with the absolute value of the relative number of bytes from slot_start_point.

PES_packet_start_offset indicates the head byte of the packet header of a PES packet which contains the byte position indicated by sequence_header start offset. The value is represented with the absolute value of the relative number of bytes from slot_start_point.

pack_start_offset indicates the head byte of the pack header of a pack which contains the byte position indicated with sequence_header_start_offset. The value is represented with the absolute value of the relative number of bytes from slot_start_point.

(in case of "info_type==MPEG2_System_TS")

sequence_header_start_offset indicates the first byte of the sequence header which is located before the addressed slot_start_point bit position and is located nearest to the slot_start_point. The value is represented with the absolute value of the relative number of bytes from slot_start_point.

TS_packet_start_offset indicates the head byte of the packet header of a TS packet which contains the byte position indicated with sequence_header_start_offset. The value is represented with the number obtained by dividing the absolute value of the relative number of bytes from the head byte of the packet header of a TS which contains slot_start_point by 188.

PES_packet_start_offset indicates the head byte of the PES packet which contains the byte position indicated with TS_packet_start_offset. The value is represented with the absolute value of the relative number of bytes from slot_start_point.

TS_packet_start_offset2 indicates the head byte of the TS packet which contains the byte position indicated with PES_packet_start_offset. The value is obtained by dividing the absolute value of the relative number of bytes from the head byte of the packet header of the TS packet which contains slot_start_point by 188.

(in case of "info_type==MEPG2_System_PS")

sequence_header_start_offset indicates the first byte of the sequence header located before the addressed slot_ start_point bit position and is located nearest to the slot_start_point. The value is represented with the absolute value of the relative number of bytes from the slot_start_point.

PES_packet_start_offset indicates the head byte of the packet header of the PES packet which contains the byte position indicated with sequence_header_start_offset. The value is represented with the absolute value of the relative number of bytes from the slot_start point. GOPH_existence_flag is a flag for representing whether the header just before slot_start_pint is GOP header, and is effective only when the addressed slot_start_point is a picture header.

first_presented_picture_structure is picture_structure of a picture displayed first of this slot as shown in FIG. 65.

copy_closed_GOP represents copy of a closed GOP flag value of GOP header corresponding to this slot.

copy_broken_link represents copy of the broken link flag value corresponding to this slot.

time_stamp_of_first_picture represents the time stamp of the picture which is displayed first in the addressed slot or the time information or the like for AV synchronization.

GOP_status represents GOP status and is composed of flags, for example, for indicating the inclusion of editing point.

picture_count_type represents picture count type (frame or field) as shown in FIG. 66. Because of the problem of 3-2 pull down and top or bottom field first, picture count in frame unit can cause an error, it is allowed to count in field unit.

number_of_picture represents the number of pictures contained in the slot, and is a value counted in the unit specified with picture_count_type.

encode_info ( ) represents an area for recording the information supplied from the encoder which encodes this stream.

buffer_occupancy ( ) represents the information which relates to buffer occupancy.

camera_info ( ) represents the image taking condition information (camera movement correction information, aperture of camera, shutter speed, brightness) in the case that this information is the information obtained using a video camera.

reserved represents an extended area.

Syntax of slot_info_for_one_audio_frame ( ) is shown in FIG. 67.

MPEG audio stream information is written in the order of bit stream file arrangement for each AAU (Audio Access Unit: audio frame).

AAU_storage_length represents the difference between the head address of the PES packet which contains the head of the addressed AAU and the head of the PES packet which contains the head of the next AAU, and to find the position of the packet in which the head of AAU, difference values are added.

AAU_start_byte_position represents the length from the head of the PES packet which contains the head of the addressed AAU to the head byte of AAU.

flags represents various flags.

encode_info ( ) represents an area for recording the information supplied from an encoder which encodes this stream.

camera_info ( ) represents the image taking condition information (camera movement correction information, aperture of camera, shutter speed, brightness, frame taking photographing, AE mode, WB mode, planning speed, shutter) in the case that this information is an image information obtained using a video camera.

Syntax of slot_info_for_one_time_slot ( ) is shown in FIG. 68.

The cases that the present invention is applied to optical disc apparatuses are described hereinbefore as examples, however alternatively, the present invention may be applied to the case that other recording media are used for recording or reproducing the information.

As the distribution media for distributing the computer program for performing processing as described hereinbefore to users, recording media such as magnetic discs, CD-ROMs, and solid memories as well as communication media such as network and satellite may be used.

Because according to the recording apparatus described in claim 1, the recording method described in claim 5, and distribution medium described in claim 6, the characteristic point information of the video signal or audio signal contained in the file is recorded in a recording medium for each file, it is possible to control reproduction of the video signal or audio signal in file unit.

Because according to the reproduction apparatus described in claim 7, the reproduction method described in claim 8, and distribution medium described in claim 9, reproduction of the file is controlled based on the characteristic point information recorded in the recording medium for each file, it is possible to manage the file.

Because according to the recording apparatus described in claim 10, the recording method described in claim 11, and the distribution medium, the characteristic point information of the video signal is detected, and the video signal and characteristic point information are both recorded in a recording medium, then recording is performed without deterioration of the image quality, and it is possible to take random access to the recorded video signal. Because it is possible to recording/reproducing in the same system, high cost of a recording/reproducing apparatuses are suppressed regardless that the video signal is compressed or not compressed.

Because according to the recording/reproducing apparatus, recording/reproducing method described, and the distribution medium, files and characteristic point information of each file are recorded in a recording medium, reproduction of files is controlled correspondingly to the characteristic point information reproduced from the recording medium, it is possible to realize an easy file management system.

What is claimed is:

1. A recording apparatus, comprising:
   stream file generation means for generating stream files containing video and/or audio signals; the stream files being composed of MPEG compressed video data;
   characteristic point information generation means for generating plural types of characteristic point information from the video and/or audio signals contained in each stream file generated by said file generation means; the characteristic point information including positional information indicating a user designated position and content related positions; the characteristic point information being included in a management information file corresponding to each stream file and being used to access characteristic points when reproducing the stream files; and
   recording means for recording the stream files and corresponding management information files containing the plural types of characteristic point information in a recording medium, the management information files being recorded in a different area of said recording medium than the stream files; the type of characteristic point information being correlated with a record position of the characteristic point information.

2. A recording apparatus as claimed in claim 1, wherein said characteristic point information is a head position finding information, pointer information, slot_info( ), or video_attribute.

3. A recording apparatus as claimed in claim 2, wherein said video_attribute contains aspect_ratio or display_mode.

4. A recording method, including:
   a stream file generation step for generating stream files containing video and/or audio signals; the stream files being composed of MPEG compressed video data;
   a characteristic point information generation step of generating plural types of characteristic point information from the video and/or audio signals contained in each stream file generated by said file generation step; the characteristic point information including positional information indicating a user designated position and content related positions; the characteristic point information being included in a management information file corresponding to each stream file and being used to access characteristic points when reproducing the stream files; and
   a recording step of recording the stream files and corresponding management information files containing the plural types of characteristic point information in a recording medium, the management information files being recorded in a different area of said recording medium than the stream files: the type of characteristic point information being correlated with a record position of the characteristic point information.

5. A distribution medium for distributing a program which is read by a computer to control an information processing apparatus, including:
   a stream file generation step for generating stream files containing video and/or audio signals; the stream files being composed of MPEG compressed video data;
   a characteristic point information generation step of generating plural types of characteristic point information from the video and/or audio signals contained in each stream file generated by said file generation step; the characteristic point information including positional information indicating a user designated position and content related positions; the characteristic point information being included in a management information file corresponding to each stream file and being used to access characteristic points when reproducing the stream files; and
   a recording step of recording the stream files and corresponding management information files containing the plural types of characteristic point information in a recording medium, the management information files being recorded in a different area of said recording medium than the stream files; the type of characteristic point information being correlated with a record position of the characteristic point information.

6. A reproducing apparatus, comprising:
   stream file reproducing means for reproducing stream files containing video and/or audio signals recorded on a recording medium; the stream files being composed of MPEG compressed video data;
   characteristic point information reproducing means for reproducing plural types of characteristic point information from a management information file corresponding to each stream file reproduced by said stream file reproducing means; the characteristic point information including positional information indicating a user designated position and content related positions; the management information files being located in a different area of said recording medium than the stream files; the type of characteristic point information being correlated with a record position of the characteristic point information; and
   reproduction control means for controlling reproduction of said stream files based on the plural types of said characteristic point information reproduced from the corresponding management information files by said characteristic point information reproducing means.

7. A reproducing method, including:
   a stream file reproducing step of reproducing stream files containing video and/or audio signals recorded on a recording medium; the stream files being composed of MPEG compressed video data;
   a characteristic point information reproducing step of reproducing plural types of characteristic point information from a management information file corresponding to each stream file reproduced by said stream file reproducing step; the characteristic point information including positional information indicating a user designated position and content related positions; the management information files being located in a different area of said recording medium than the stream files; the type of characteristic point information being correlated with a record position of the characteristic point information; and
   a reproduction control step of controlling reproduction of said stream files based on the plural types of said characteristic point information reproduced from the corresponding management information files in said characteristic point information reproducing step.

8. A distribution medium for distributing a program which is read by a computer to control an information processing apparatus, including:
   a stream file reproducing step of reproducing stream files containing video and/or audio signals recorded on a recording medium; the stream files being composed of MPEG compressed video data;
   a characteristic point information reproducing step of reproducing plural types of characteristic point information from a management information file corresponding to each stream file reproduced by said stream file reproducing step; the characteristic point information including positional information indicating a user designated position and content related positions; the management information files being located in a different area of said recording medium than the stream files; the type of characteristic point information being correlated with a record position of the characteristic point information; and
   a reproduction control step of controlling reproduction of said stream files based on the plural types of said characteristic point information reproduced from the corresponding management information files in said characteristic point information reproducing step.

9. A recording/reproducing apparatus, comprising:
   stream file generation means for generating stream files containing video and/or audio signals; the stream files being composed of MPEG compressed video data;
   characteristic point information generation means for generating plural types of characteristic point information from the video and/or audio signals contained in each stream file generated by said file generation means; the characteristic point information including positional information indicating a user designated position and content related positions; the characteristic point information being included in a management information file corresponding to each stream file and being used to access characteristic points when reproducing the stream files;

recording means for recording the stream files and corresponding management information files containing the plural types of characteristic point information in a recording medium, the management information files being recorded in a different area of said recording medium than the stream files; the type of characteristic point information being correlated with a record position of the characteristic point information;

stream file reproducing means for reproducing the stream files which contain video and/or audio signals recorded on said recording medium;

characteristic point information reproducing means for reproducing the plural types of characteristic point information from a management information file corresponding to each stream file reproduced by said stream file reproducing means; and reproduction control means for controlling reproduction of said stream files based on the plural types of said characteristic point information reproduced from the corresponding management information files by said characteristic point information reproducing means.

10. A recording/reproducing method, including:

a stream file generation step for generating stream files containing video and/or audio signals; the stream files being composed of MPEG compressed video data;

a characteristic point information generation step of generating plural types of characteristic point information from the video and/or audio signals contained in each stream file generated by said file generation step; the characteristic point information including positional information indicating a user designated position and content related positions; the characteristic point information being included in a management information file corresponding to each stream file and being used to access characteristic points when reproducing the stream files;

a recording step of recording the stream files and corresponding management information files containing the plural types of characteristic point information in a recording medium, the management information files being recorded in a different area of said recording medium than the stream files; the type of characteristic point information being correlated with a record position of the characteristic point information;

a stream file reproducing step of reproducing the stream files which contain video and/or audio signals recorded on said recording medium;

a characteristic point information reproducing step of reproducing plural types of characteristic point information from a management information file corresponding to each stream file reproduced by said stream file reproducing step; and a reproduction control step of controlling reproduction of said stream files based on the plural types of said characteristic point information reproduced from the corresponding management information files in said characteristic point information reproducing step.

11. A distribution medium for distributing programs which are read by a computer to control an information processing apparatus, including:

a stream file generation step for generating stream files containing video and/or audio signals; the stream files being composed of MPEG compressed video data;

a characteristic point information generation step of generating plural types of characteristic point information from the video and/or audio signals contained in each stream file generated by said file generation step; the characteristic point information including positional information indicating a user designated position and content related positions; the characteristic point information being included in a management information file corresponding to each stream file and being used to access characteristic points when reproducing the stream files;

a recording step of recording the stream files and corresponding management information files containing the plural types of characteristic point information in a recording medium, the management information files being recorded in a different area of said recording medium than the stream files; the type of characteristic point information being correlated with a record position of the characteristic point information;

a stream file reproducing step of reproducing the stream files which contain video and/or audio signals recorded on said recording medium;

a characteristic point information reproducing step of reproducing plural types of characteristic point information from a management information file corresponding to each stream file reproduced by said stream file reproducing step; and a reproduction control step of controlling reproduction of said stream files based on the plural types of said characteristic point information reproduced from the corresponding management information files in said characteristic point information reproducing step.

* * * * *